(12) United States Patent
Kurihara et al.

(10) Patent No.: US 7,090,262 B2
(45) Date of Patent: Aug. 15, 2006

(54) FUEL TANK CONNECTOR

(75) Inventors: Kazumasa Kurihara, Yokohama (JP); Toshihide Kimisawa, Yokohama (JP); Tsuyoshi Kato, Yokohama (JP); Yasutomo Kobayashi, Yokohama (JP); Masami Honma, Kanagawa-ken (JP); Katsunori Ozaki, Kanagawa-ken (JP); Hiroshi Kumagai, Kanagawa-ken (JP); Katsumi Morohoshi, Kanagawa-ken (JP)

(73) Assignees: Nifco, Inc., Kanagawa (JP); Nissan Motor Co., Ltd., Kanagawa-ken (JP)

( * ) Notice: Subject to any disclaimer, the term of this patent is extended or adjusted under 35 U.S.C. 154(b) by 81 days.

(21) Appl. No.: 10/657,796

(22) Filed: Sep. 9, 2003

(65) Prior Publication Data

US 2004/0056482 A1 Mar. 25, 2004

Related U.S. Application Data

(63) Continuation of application No. 09/984,450, filed on Oct. 30, 2001, now Pat. No. 6,733,048.

(30) Foreign Application Priority Data

| Nov. 2, 2000 | (JP) | ............................... 2000-336766 |
| Feb. 26, 2001 | (JP) | ............................... 2001-050087 |
| Oct. 3, 2001 | (JP) | ............................... 2001-307115 |

(51) Int. Cl.
*F16K 24/04* (2006.01)

(52) U.S. Cl. .................... 285/423; 285/141.1; 137/43; 137/202

(58) Field of Classification Search ................ 285/423, 285/141.1, 136.1; 137/43, 202
See application file for complete search history.

(56) References Cited

U.S. PATENT DOCUMENTS

| 5,103,865 A | 4/1992 | Hyde |
| 5,139,043 A | 8/1992 | Hyde et al. |
| 5,402,818 A | 4/1995 | Kasugai et al. |
| 5,404,907 A | 4/1995 | Benjey et al. |
| 5,425,470 A | 6/1995 | Duhaime et al. |
| 5,518,018 A | 5/1996 | Roetker |
| 5,522,417 A | 6/1996 | Tomioka et al. |
| 5,582,198 A | 12/1996 | Nagino et al. |
| 5,618,599 A | 4/1997 | Nulman et al. |
| 6,035,884 A | 3/2000 | King et al. |
| 6,170,510 B1 | 1/2001 | King et al. |
| 6,288,539 B1 | 9/2001 | Nishi et al. |

(Continued)

FOREIGN PATENT DOCUMENTS

DE 195 35 413 C1 10/1996

(Continued)

OTHER PUBLICATIONS

Patent Abstracts of Japan, vol. 2000 No. 4, Aug. 31, 2000.

*Primary Examiner*—David Bochna
(74) *Attorney, Agent, or Firm*—Sughrue Mion, PLLC

(57) ABSTRACT

A fuel tank connector for connecting a fuel tank and a pipe in communicating fashion includes a gas barrier member made of a synthetic resin and having a gas barrier property. The gas barrier member includes a tubular portion and a flanged portion provided on a peripheral side of the tubular portion, which extends beyond an opening of the fuel tank. The gas barrier member is made of a liquid crystal polymer, aromatic polyamide, a blended polymer of an ethylene-vinyl alcohol copolymer and high-density polyethylene, a blended polymer of polyamide and polyethylene, or a blended polymer of polyamide and high-density polyethylene.

4 Claims, 22 Drawing Sheets

U.S. PATENT DOCUMENTS 6,289,915 B1  9/2001  Nulman et al.
6,405,747 B1  6/2002  King et al.
6,475,625 B1 * 11/2002  Muto et al. .................... 285/31

FOREIGN PATENT DOCUMENTS

| EP | 0 470 605 A1 | 2/1992 |
| EP | 0 567 947 A1 | 11/1993 |
| EP | 0 587 005 A1 | 3/1994 |
| EP | 0 742 096 A2 | 11/1996 |
| EP | 0 764 515 A2 | 3/1997 |
| EP | 1 108 653 A1 | 6/2001 |
| EP | 1 142 935 A2 | 10/2001 |
| EP | 1 197 373 A2 | 4/2002 |
| JP | 2002-114047 A | 4/2002 |
| WO | WO 01/94819 A1 | 12/2001 |

* cited by examiner

FUEL TANK CONNECTOR

CROSS-REFERENCE TO RELATED APPLICATIONS

The present application claims priority under 35 U.S.C. § 119 to Japanese Patent Applications Nos. 2000-336766, 2001-50087 and 2001-307115, filed Nov. 2, 2000, Feb. 26, 2001 and Oct. 3, 2001, respectively, entitled "Fuel Tank Connector". The contents of these applications are incorporated herein by reference in their entirety. In addition, this is a continuation of application Ser. No. 09/984,450 filed Oct. 30, 2001, now U.S. Pat. No. 6,733,048; the disclosure of which is incorporated herein by reference.

BACKGROUND OF THE INVENTION

1. Field of the Invention

The present invention relates to a fuel tank connector, in particular a connector capable of effectively decreasing leakage of evaporative emissions from a fuel tank.

2. Discussion of Background

As shown in FIGS. 23 and 24, a fuel tank 100 usually has a pipe 101, such as a fuel feeding pipe and a pipe for guiding gas generating from the fuel, connected thereto. The connection of the pipe 101 is made by use of a connector 110 fitted to the fuel tank 100 as shown in FIGS. 23 and 24.

The connector 110, which is shown in FIGS. 23 and 24, includes a tubular portion 111 for connection with the pipe 101, a flanged portion 112 projecting laterally from a peripheral portion of one end of the tubular portion 111 melt-bonded to the tank 100 so as to cover an opening 100a in the tank 100, and a fuel cutoff valve 113 provided in the flanged portion 112 on a side opposite the tubular portion 111. The tubular portion 111 and the flanged portion 112 are integrally molded from high-density polyethylene.

The fuel cutoff valve 113 in the shown connector 110 includes a float chamber forming box 113b formed in a cylindrical shape, having a valve seat unit 113a with a valve seat 113a' at the opening of a bore in communication with a bore in the tubular portion 111, having a bottom opened and made of polyacetal; a float 113c having an upper portion integrally formed with a valve 113e and housed in the box 113b so as to be slidable therein; and a lid 113d closing the opened bottom of the box 113b and cooperating with the box to form the float chamber with the float 113c incorporated therein. As the float 113c rises, the valve 113e makes close contact with the valve seat 113a' to close the opening.

In the connector 110, the box 113b of the fuel cutoff valve 113 is configured to be integrally fitted to the flanged portion 112 so as to have an upper side of the box 113b embedded in the flanged portion 112 by, e.g., plastic molding wherein the box is integrally united to the flanged portion with the box being inserted in a mold. A peripheral portion of the flanged portion 112 with the box 113b is melt-bonded to a surface of the tank 100 around the opening 100a of the tank 100 with the box 113b being inserted into the tank 100 through the opening 100a of the tank 100.

In the connector 110 thus configured, the flanged portion 112 and the tubular portion 111 are made of high-density polyethylene. The evaporative emissions generating from the fuel in the tank 100 or another member have been predicted to leak out, though at a regulated value or less, through a portion of the flanged portion 112 provided between an edge of the opening 100a of the tank and the box 113b of the connector 110 melt-bonded to the tank 100.

SUMMARY OF THE INVENTION

It is an object of the present invention to provide an easy-to-mold connector capable of effectively decreasing leakage of evaporative emissions from a fuel tank, which is predicted in the conventional connector.

In order to attain the object, according to a first aspect of the present invention, there is provided a fuel tank connector adapted to be fitted to an opening of a fuel tank to connect the fuel tank and a pipe in communicating fashion, comprising:

a gas barrier member made of a synthetic resin having a gas barrier property, the gas barrier member including a tubular portion and a flanged portion provided on a peripheral side of the tubular portion and having a greater side than an opening of the fuel tank;

wherein the gas barrier member is made of polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, or polyethylene terephthalate;

the gas barrier member has at least a portion of a surface covered with an outer shell made of an olefin resin having an adhesive property, polyethylene or high-density polyethylene; and the outer shell includes an annular projected portion, which covers a leading end of the flanged portion and projects toward an outer surface of the fuel tank.

The fuel tank connector thus constructed can effectively minimize that evaporative emissions deriving from the fuel in the fuel tank leak from the connector.

Additionally, the gas barrier member with the outer shell can be melt-bonded to the fuel tank at the outer shell in reliable and easy fashion.

With regard to a fuel tank with an outer surface layer made of high-density polyethylene, the connector can be fitted to the fuel tank through the annular projected portion of the outer shell with high bonding strength maintained, effectively minimizing the leakage of the evaporative emissions from the fuel tank by the gas barrier member.

In order to attain the object, according to a second aspect of the present invention, the flanged portion has a peripheral portion melt-bonded to a synthetic resin having a gas barrier property and forming a fuel tank to fit the connector to the fuel tank, in the first aspect.

The fuel tank connector thus constructed can further effectively minimize the leakage of the evaporative emissions from the fuel tank, in addition to the advantages stated earlier.

In order to attain the object, according to a third aspect of the present invention, at least a portion of the outer shell made of an olefin resin having an adhesive property, and at least a portion of a surface of the gas barrier member uncovered with the outer shell are covered with an additional outer shell made of high-density polyethylene, in the first or the second aspect.

In the fuel tank connector thus constructed, the outer shell, which is made of high-density polyethylene, can be fitted to the gas barrier member in easier and more reliable fashion, allowing the connector to be fitted to the fuel tank in more reliable and easier fashion, in addition to the advantages stated earlier.

In order to attain the object, according to a fourth aspect of the present invention, the gas barrier member has the leading end of the flanged portion provided with an annular projected portion, which projects toward the outer surface of the fuel tank, in the first, the second or the third aspect.

In the fuel tank connector thus constructed, design freedom in fitting of the connector to the fuel tank can increase in such a manner to effectively minimize the leakage of evaporative emissions from the fuel tank in addition to the advantages stated earlier.

In order to attain the object, according to a fifth aspect of the present invention, the gas barrier member has the leading end of the flanged portion provided with an annular projected portion, which projects toward the outer surface of the fuel tank, and the connector has the annular projected portion melt-bonded to the outer surface of the fuel tank, thereby being fitted thereto, in the first aspect.

With regard to a fuel tank with an outer layer made of high-density polyethylene, the fuel tank connector thus constructed can be fitted to the fuel tank through the annular projected portion of the outer shell and the annular projected portion of the gas barrier member with high bonding strength maintained, effectively minimizing the leakage of evaporative emissions from the fuel tank by the gas barrier member.

In order to attain the object, according to a sixth aspect of the present invention, one of the annular projected portion of the outer shell and the leading end of the flanged portion of the gas barrier member has a projection formed thereon, and the outer shell is fitted to the gas barrier member with the projection being inserted into the other one without the projection, the outer shell being made of polyethylene or high-density polyethylene, in the first aspect.

The fuel tank connector thus constructed can ensure to maintain the unity of the annular projected portion provided on the leading end of the flanged portion of the gas barrier member and the annular projected portion of the outer shell at high level.

In order to attain the object, according to a seventh aspect of the present invention, the gas barrier member has the leading end of the flanged portion provided with an annular projected portion, which projects toward the outer surface of the fuel tank and has a projecting length substantially equal to that of the annular projected portion of the outer shell, and the annular projected portion of the gas barrier member and the annular projected portion of the outer shell has a cavity formed therebetween to be opened on a side of the outer surface of the tank, the outer shell made of polyethylene or high-density polyethylene, in the first aspect.

In the fuel tank connector thus constructed, when the annular projected portion of the outer shell is heat-melted, the melted material of polyethylene or high-density polyethylene forming the annular projected portion can get into the cavity to melt-bond the annular projected portion to a fuel tank, spreading the melted material of polyethylene or high-density polyethylene in a wide range.

When the melt-bonding is carried out to leave some part of the cavity unfilled after having melt-bonded the annular projected portion of the outer shell to the fuel tank, the unfilled part can absorb the expansion of the gas barrier member, which could be caused by fuel or evaporative emissions from the fuel. This arrangement can make it difficult for a force lowering the melt-bonding strength to be applicable to the melt-bonded portion between the annular projected portion of the outer shell and the fuel tank.

In order to attain the object, according to an eighth aspect of the present invention, the gas barrier member has the leading end of the flanged portion provided with an annular projected portion, which projects toward the outer surface of the fuel tank and has a smaller projecting length substantially than the annular projected portion of the outer shell, the outer shell being made of polyethylene or high-density polyethylene, in the first aspect.

In the fuel tank connector thus constructed, when the annular projected portion of the outer shell is heat-melted, the melted material of polyethylene or high-density polyethylene forming the annular projected portion can get into between a projecting surface of the annular projected portion of the gas barrier member and the outer surface of the fuel tank to melt-bond the annular projected portion of the outer shell to the fuel tank, spreading the melted material of polyethylene or high-density polyethylene in a wide range.

In order to attain the object, according to a ninth aspect of the present invention, the gas barrier member, which is covered with the outer shell, has an upper side stepwise formed so as to have a stepped surface facing the leading end of the flanged portion of the gas barrier member, the outer shell made of polyethylene or high-density polyethylene, in the first aspect.

In the fuel tank connector thus constructed, even if the gas barrier member is swollen by fuel or evaporative emissions from the fuel, the force caused by the swell can be received by an opposed surface of the outer shell (made of polyethylene or high-density polyethylene) in contact with the stepped surface to be dispersed. This arrangement can make it difficult for a force lowering the melt-bonding strength to be applicable to the melt-bonded portion between the annular projected portion of the outer shell and the fuel tank.

In order to attain the object, according to a tenth aspect of the present invention, the fuel tank connector is used for connection with a fuel feeding pipe in the first, the second, the third, the fourth, the fifth, the sixth, the seventh, the eighth or the ninth aspect.

The fuel tank connector thus constructed can connect the fuel feeding pipe to the fuel tank in such a manner to effectively minimize the leakage of evaporative emissions from fuel, in addition to the advantages stated earlier.

In order to attain the object, according to an eleventh aspect of the present invention, the fuel tank connector is used for connection with a vent pipe in the first, the second, the third, the fourth, the fifth, the sixth, the seventh, the eighth or the ninth aspect.

The fuel tank connector thus constructed can connect the vent pipe to the fuel tank in such a manner to effectively minimize the leakage of evaporative emissions from fuel, in addition to the advantages stated earlier.

In order to attain the object, according to a twelfth aspect of the present invention, the fuel tank connector further comprises a fuel cutoff valve in the first, the second, the third, the fourth, the fifth, the sixth, the seventh, the eighth or the ninth aspect.

The fuel tank connector thus constructed can connect a pipe to the fuel tank through the fuel cutoff valve, effectively minimizing the leakage of evaporative emissions from fuel, in addition to the advantages stated earlier.

As explained, the fuel tank connector according to the present invention, which is adapted to be fitted to an opening of a fuel tank to connect the fuel tank and a pipe in communicating fashion, comprises the gas barrier member made of a synthetic resin and having a gas barrier property, the gas barrier member including the tubular portion and the flanged portion provided on the peripheral side of the tubular portion and having a greater side than the opening of the fuel tank; wherein the gas barrier member is made of polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, or polyethylene terephthalate. This arrangement can effectively minimize that evaporative emissions deriving from the fuel in the fuel tank leak from the fuel tank connector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
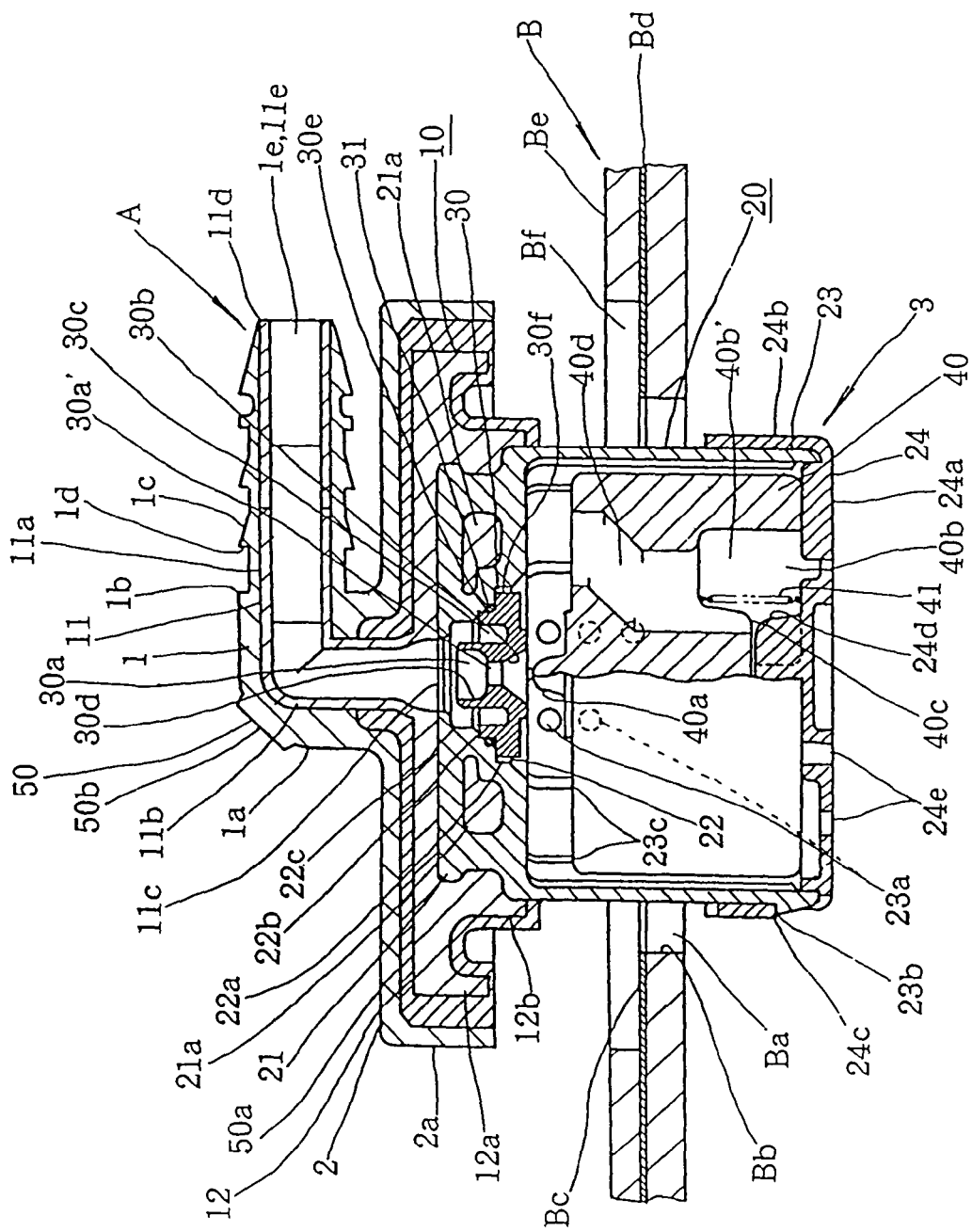
FIG. 1 is a vertical cross-sectional view showing the fuel tank connector according to a first typical embodiment of the present invention showing along with the essential parts of a fuel tank before fitting the connector to the tank.

Now, preferred embodiments of the fuel tank connector A according to the present invention will now be described with reference to the accompanying drawings, wherein like reference numerals designate corresponding or identical elements throughout the various drawings.

Figure 2:
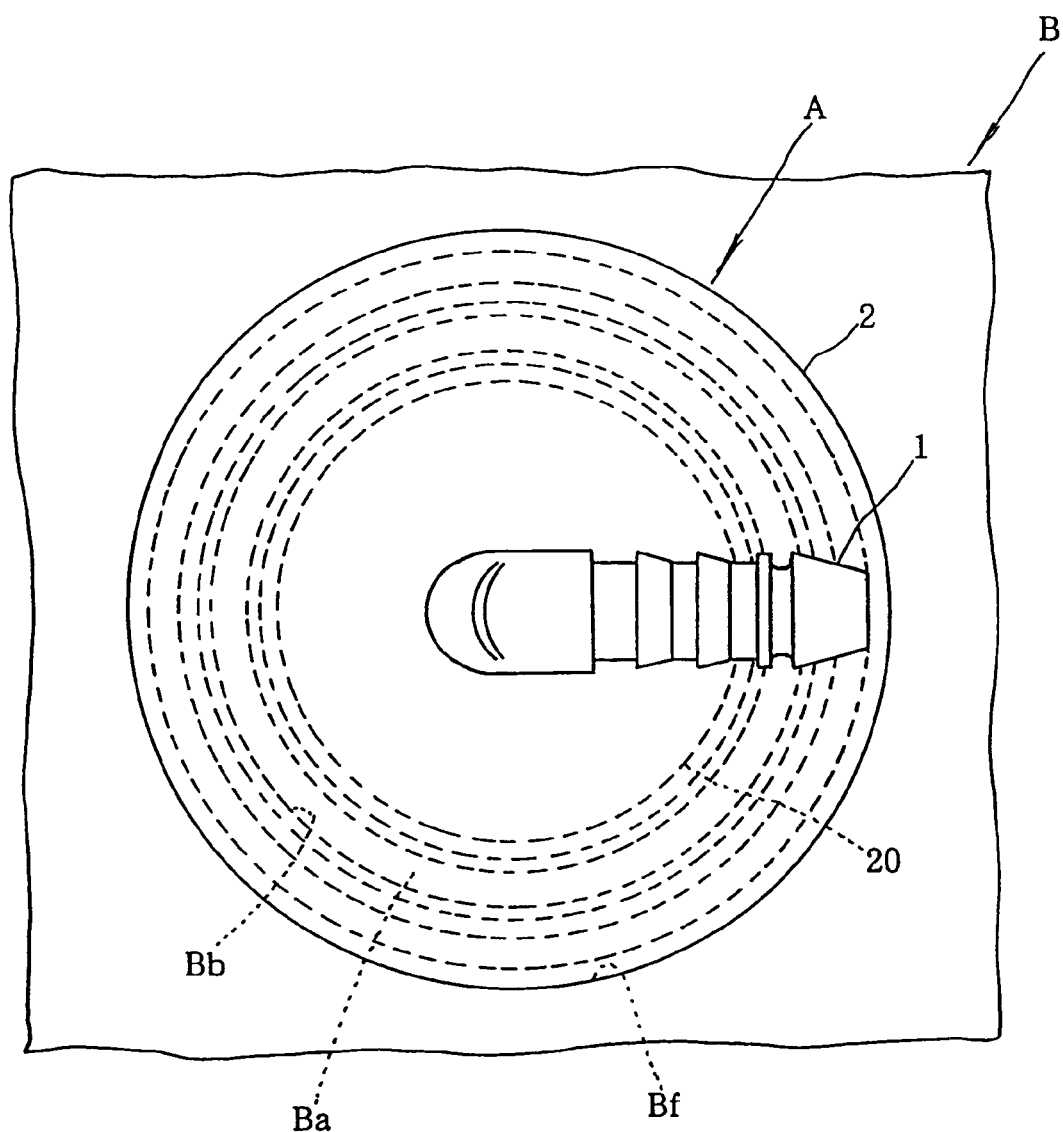
FIG. 2 is a plan view showing how the connector is put on the fuel tank before fitting the connector to the tank.
Figure 3:
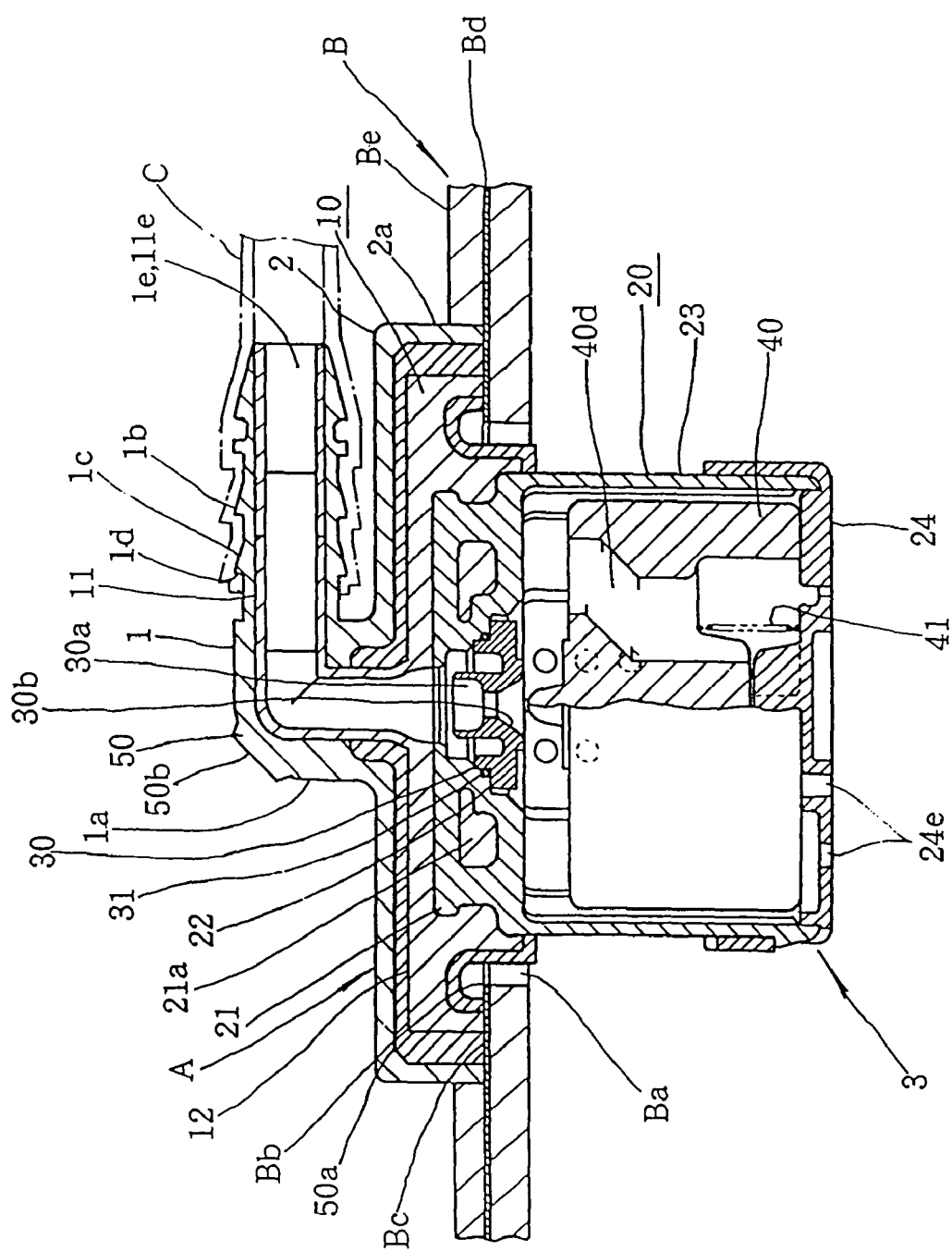
FIG. 3 is a vertical cross-sectional view showing the connector along with the essential parts of the fuel tank after fitting the connector to the tank.

FIGS. 1–3 show the fuel tank connector A according to a first typical embodiment of the present invention. FIG. 1 is a vertical cross-sectional view of the fuel tank connector A according to this embodiment along with the essential parts of a fuel tank B before the connector has been fitted to the tank, and FIG. 2 is a top plan view showing how the fuel tank connector A is put on the tank B to be fitted to the tank.

FIG. 3 is a vertical cross-sectional view of the fuel tank connector A along with the essential parts of the fuel tank B after the connector has been fitted to the tank.

Figure 4:
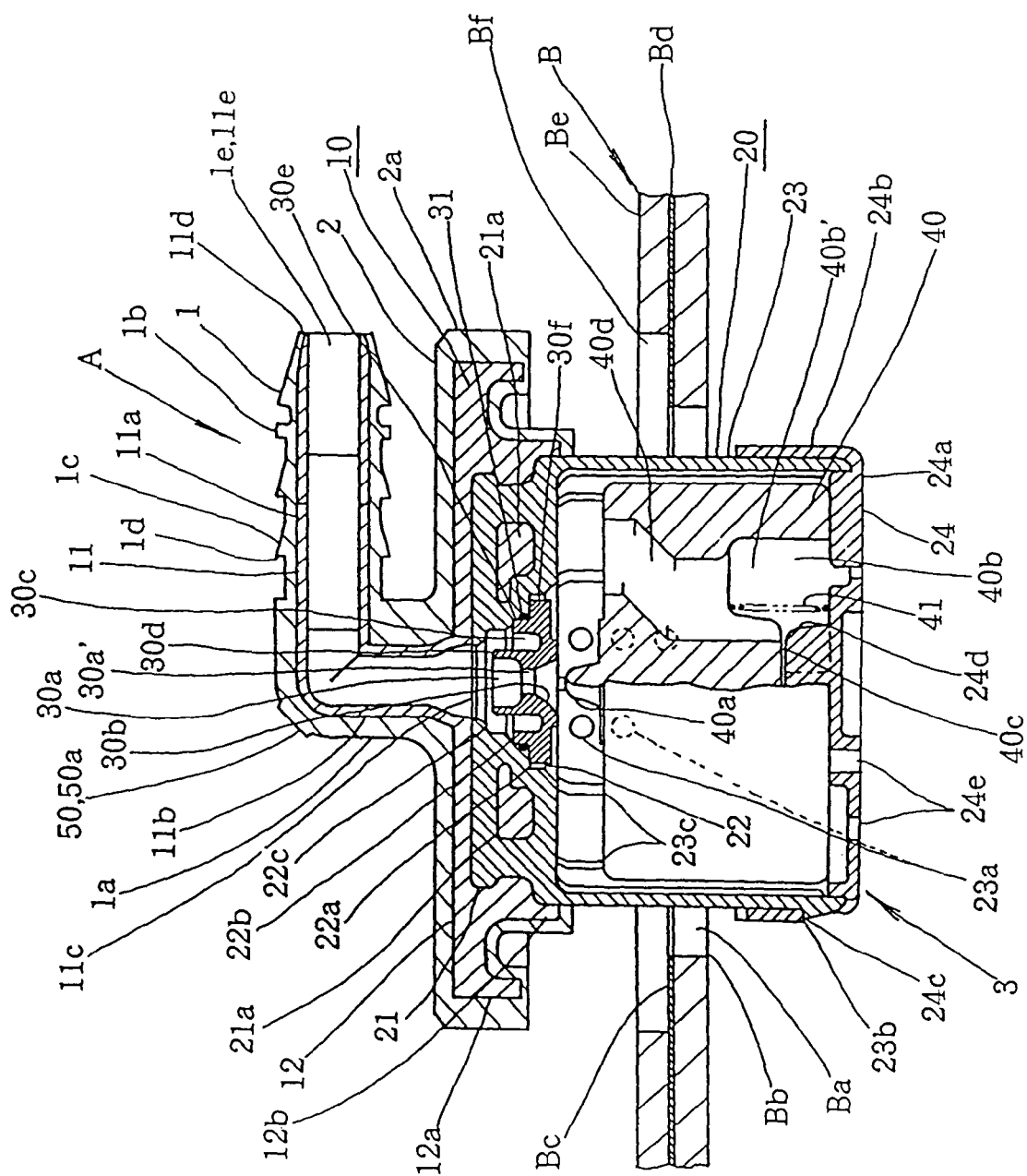
FIG. 4 is a vertical cross-sectional view showing the fuel tank connector according to a second typical embodiment of the present invention along with the essential parts of a fuel tank before fitting the connector to the tank.
Figure 5:
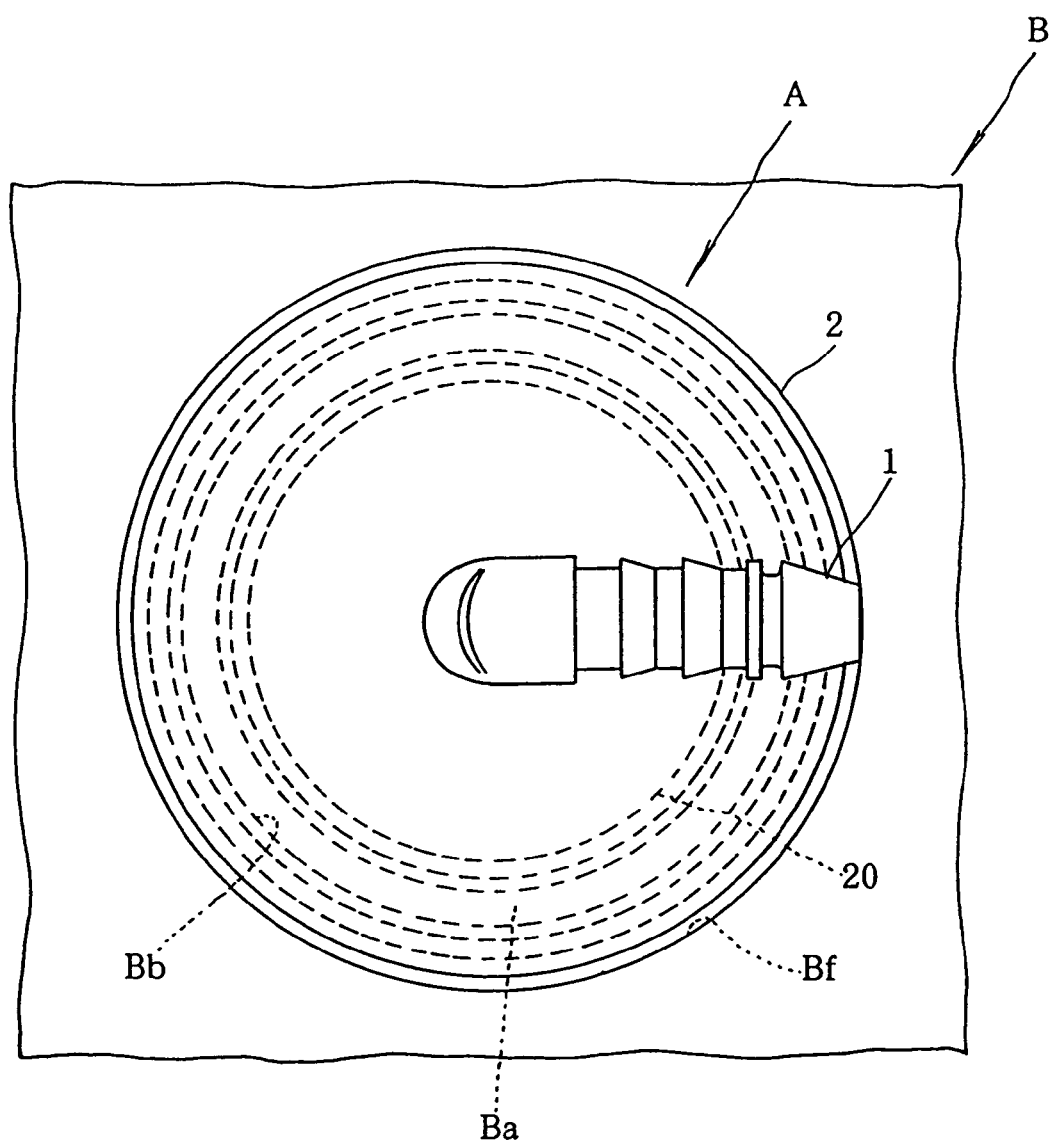
FIG. 5 is a plan view showing how the connector is put on the fuel tank before fitting the connector to the tank.
Figure 6:
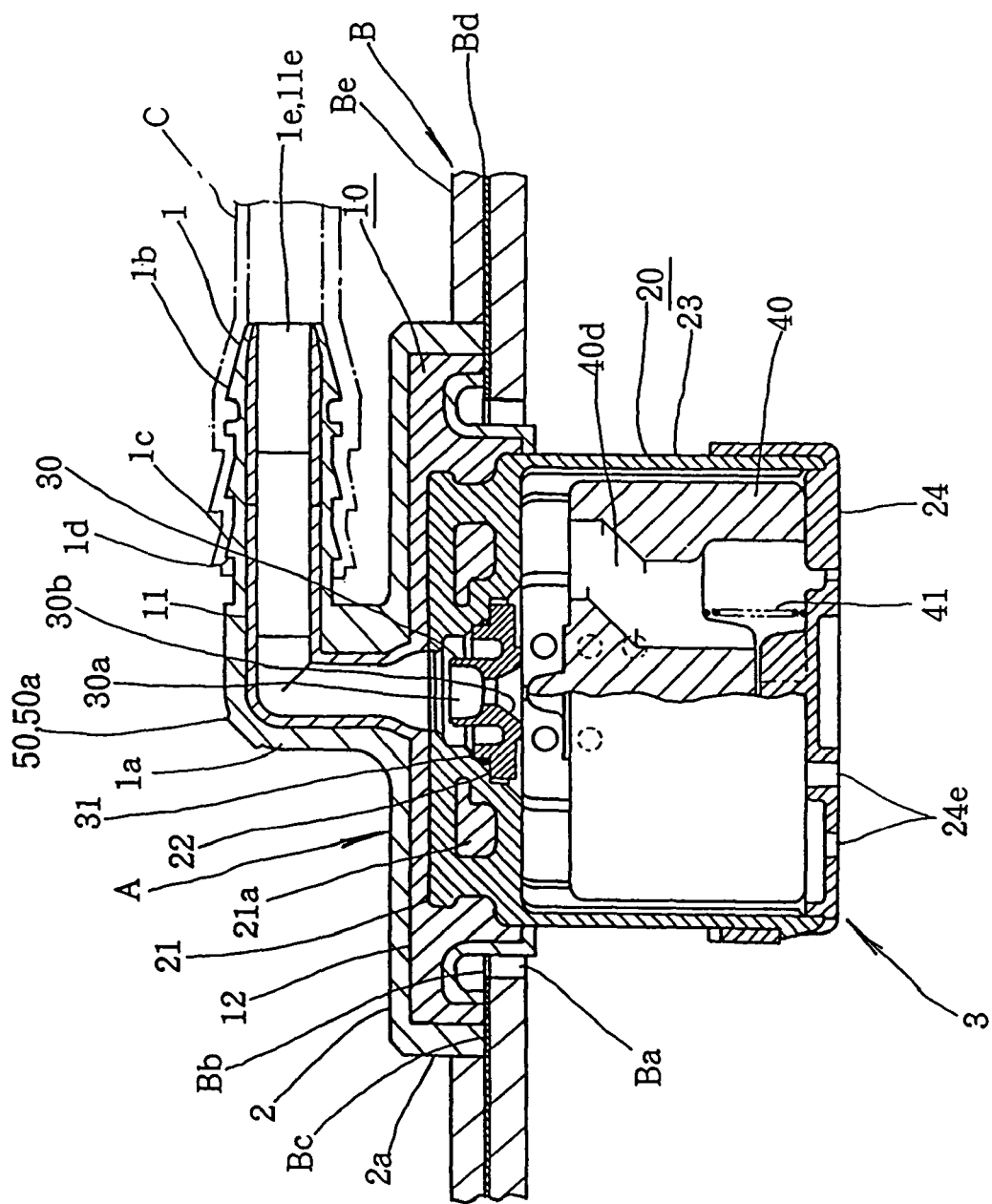
FIG. 6 is a vertical cross-sectional view showing the connector along with the tank after fitting the connector to the tank.

FIGS. 4–6 show the fuel tank connector A according to a second typical embodiment of the present invention. FIG. 4 is a vertical cross-sectional view of the fuel tank connector A according to this embodiment along with the essential parts of a fuel tank B before the connector has been fitted to the tank, and FIG. 5 is a top plan view showing how the fuel tank connector A is put on the tank B to be fitted to the tank.

FIG. 6 is a vertical cross-sectional view of the fuel tank connector A along with the essential parts of the fuel tank B after the connector has been fitted to the tank.

Figure 7:
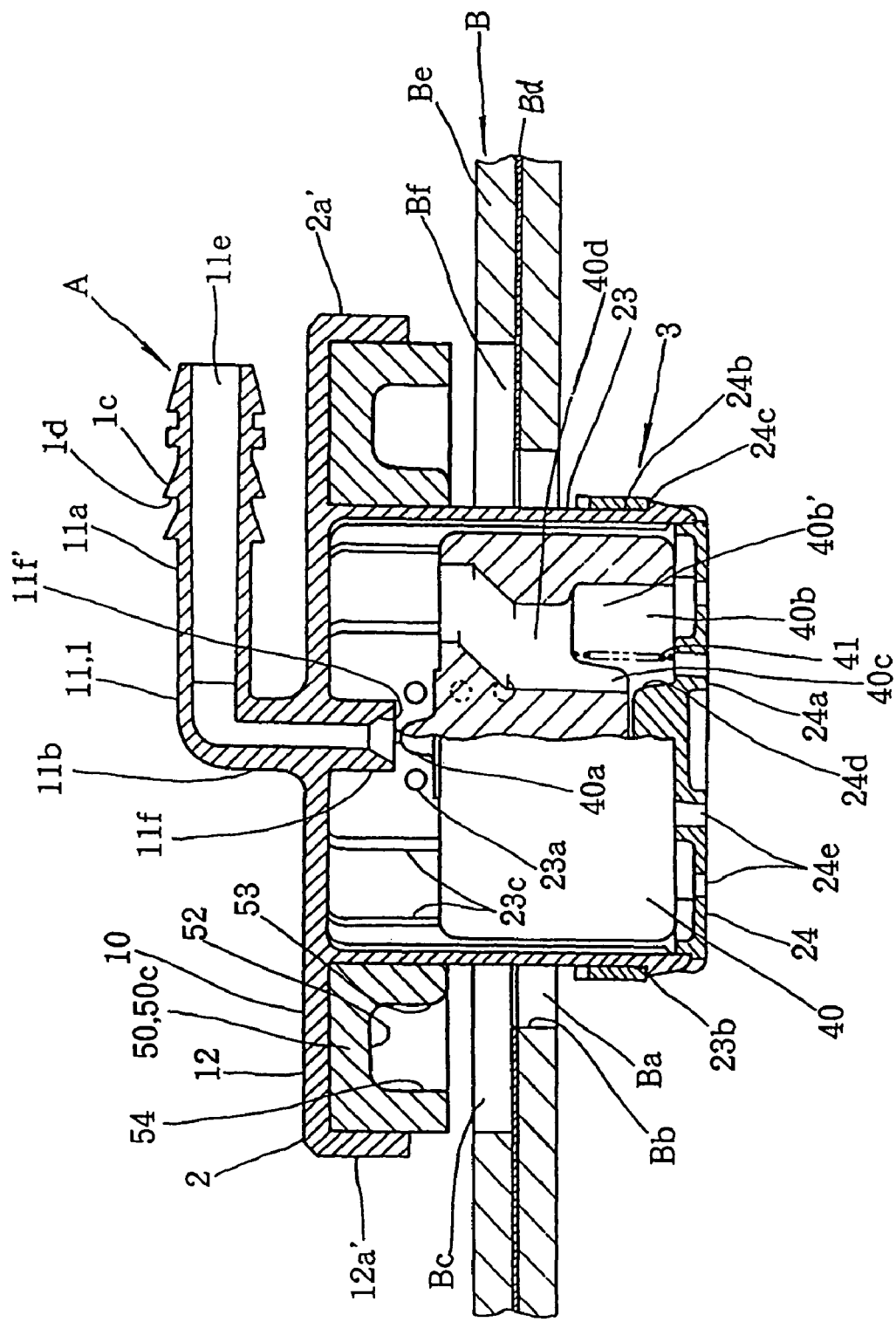
FIG. 7 is a vertical cross-sectional view showing the fuel tank connector according to a third typical embodiment of the present invention along with a fuel tank before fitting the connector to the tank.
Figure 8:
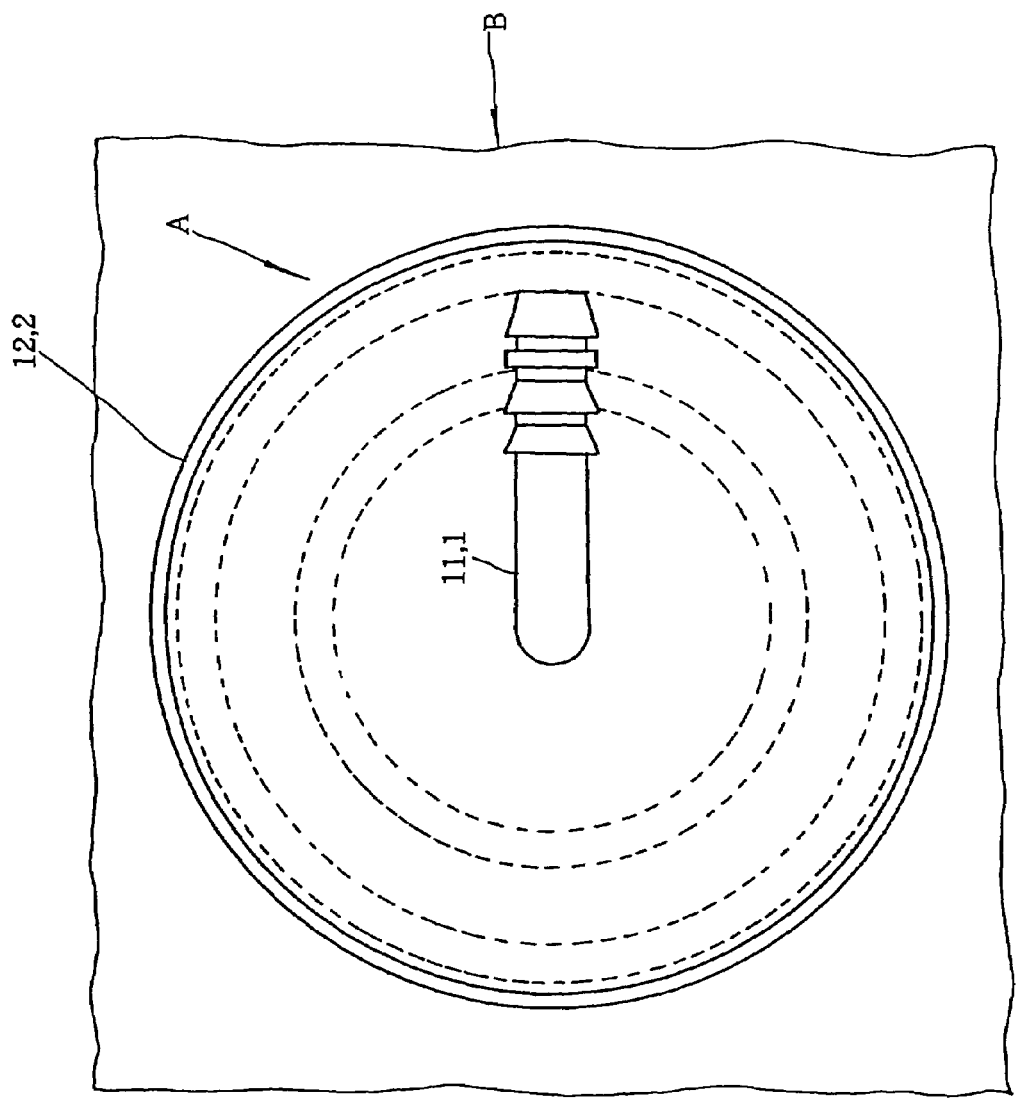
FIG. 8 is a plan view showing how the connector is put on the tank before fitting the connector the tank.
Figure 9:
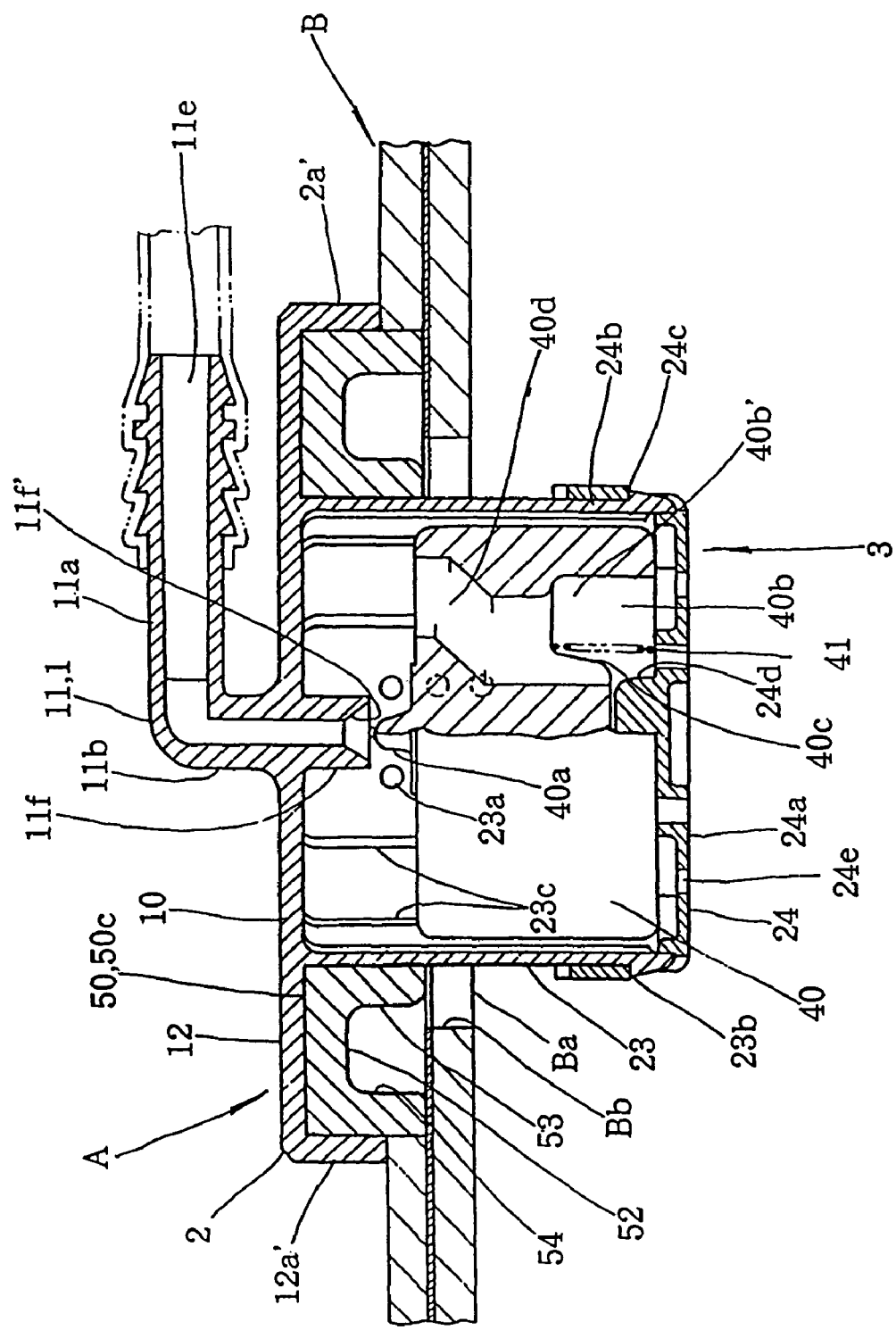
FIG. 9 is a vertical cross-sectional view showing the connector along with the tank after fitting the connector to the tank.

FIGS. 7–9 show the fuel tank connector A according to a third typical embodiment of the present invention. FIG. 7 is a vertical cross-sectional view of the fuel tank connector A according to this embodiment along with the essential parts of a fuel tank B before the connector has been fitted to the tank, and FIG. 8 is a top plan view showing how the fuel tank connector A is put on the tank B to be fitted to the tank.

FIG. 9 is a vertical cross-sectional view of the fuel tank connector A along with the essential parts of the fuel tank B after the connector has been fitted to the tank.

Figure 10:
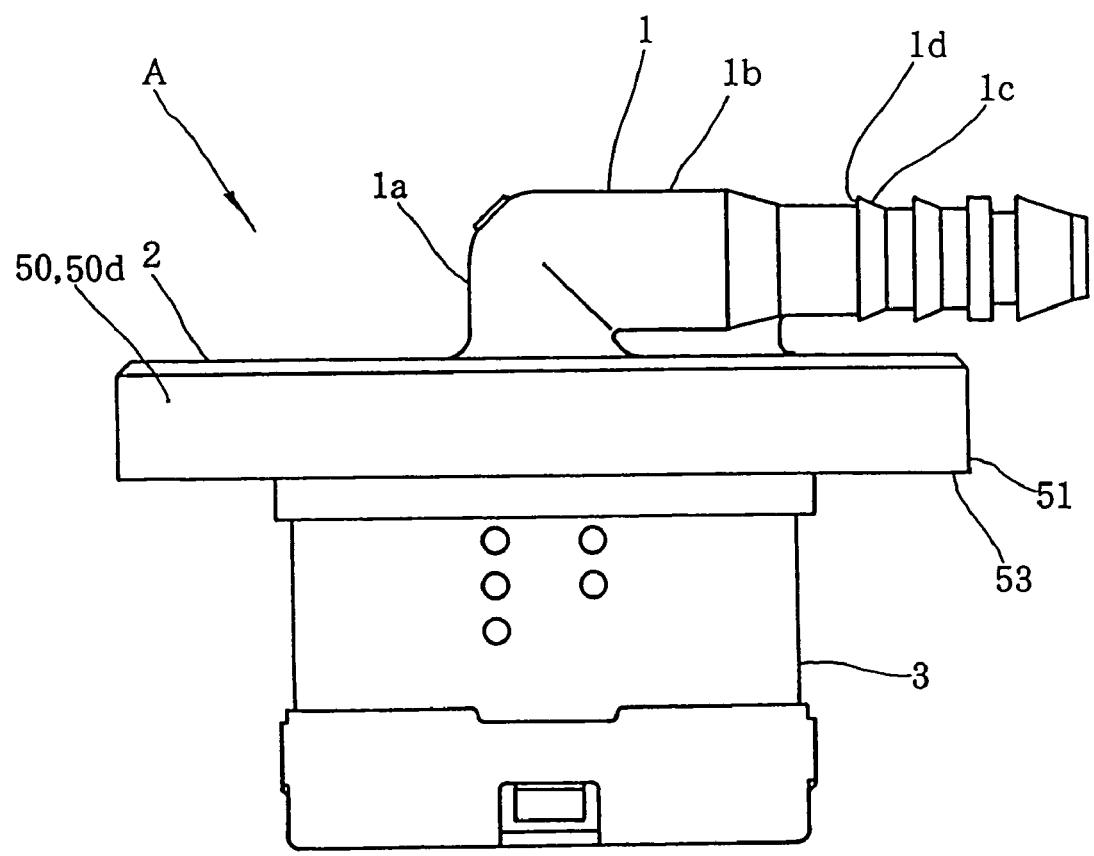
FIG. 10 is a side view of the fuel tank connector according to a fourth typical embodiment of the present invention.
Figure 11:
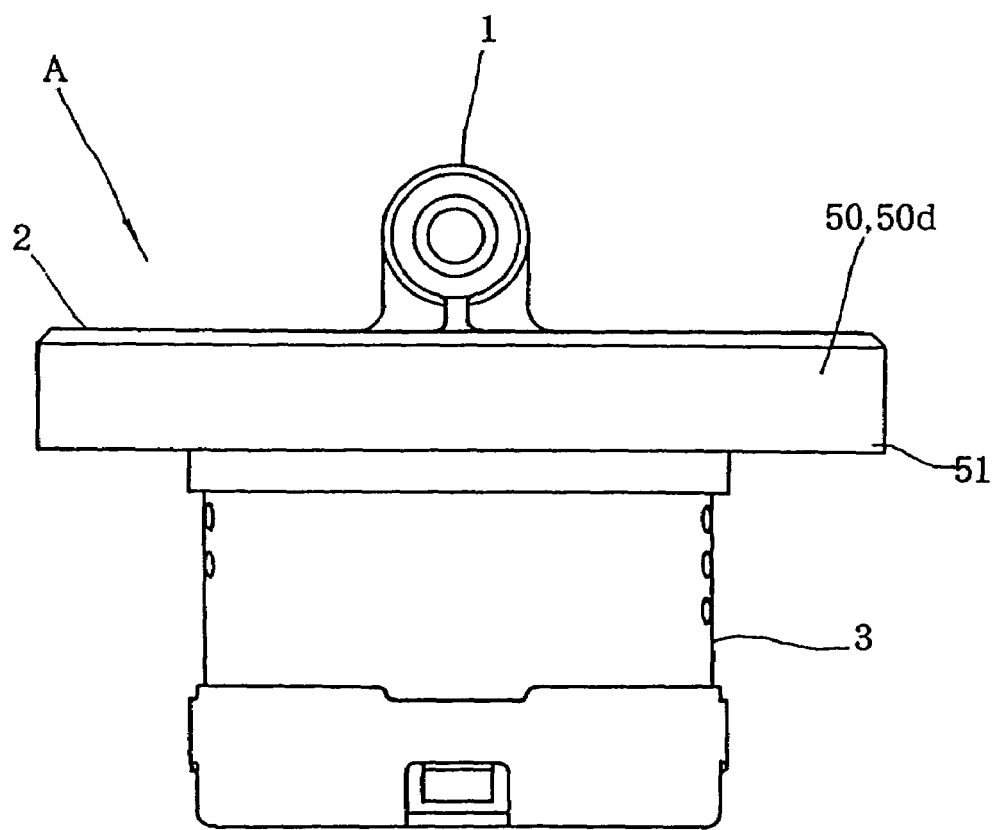
FIG. 11 is a different side view of the connector shown in FIG. 10.
Figure 12:
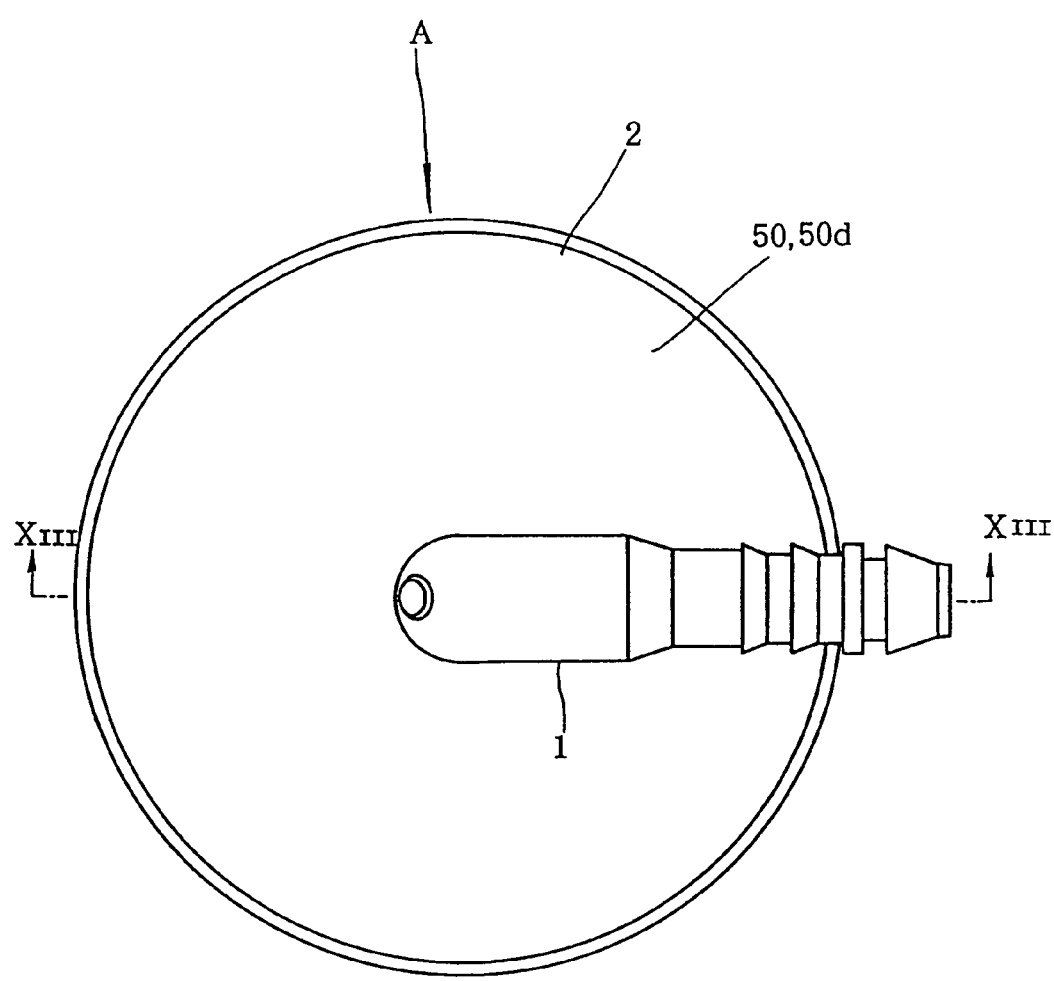
FIG. 12 is a plan view of the connector according to the fourth embodiment.
Figure 13:
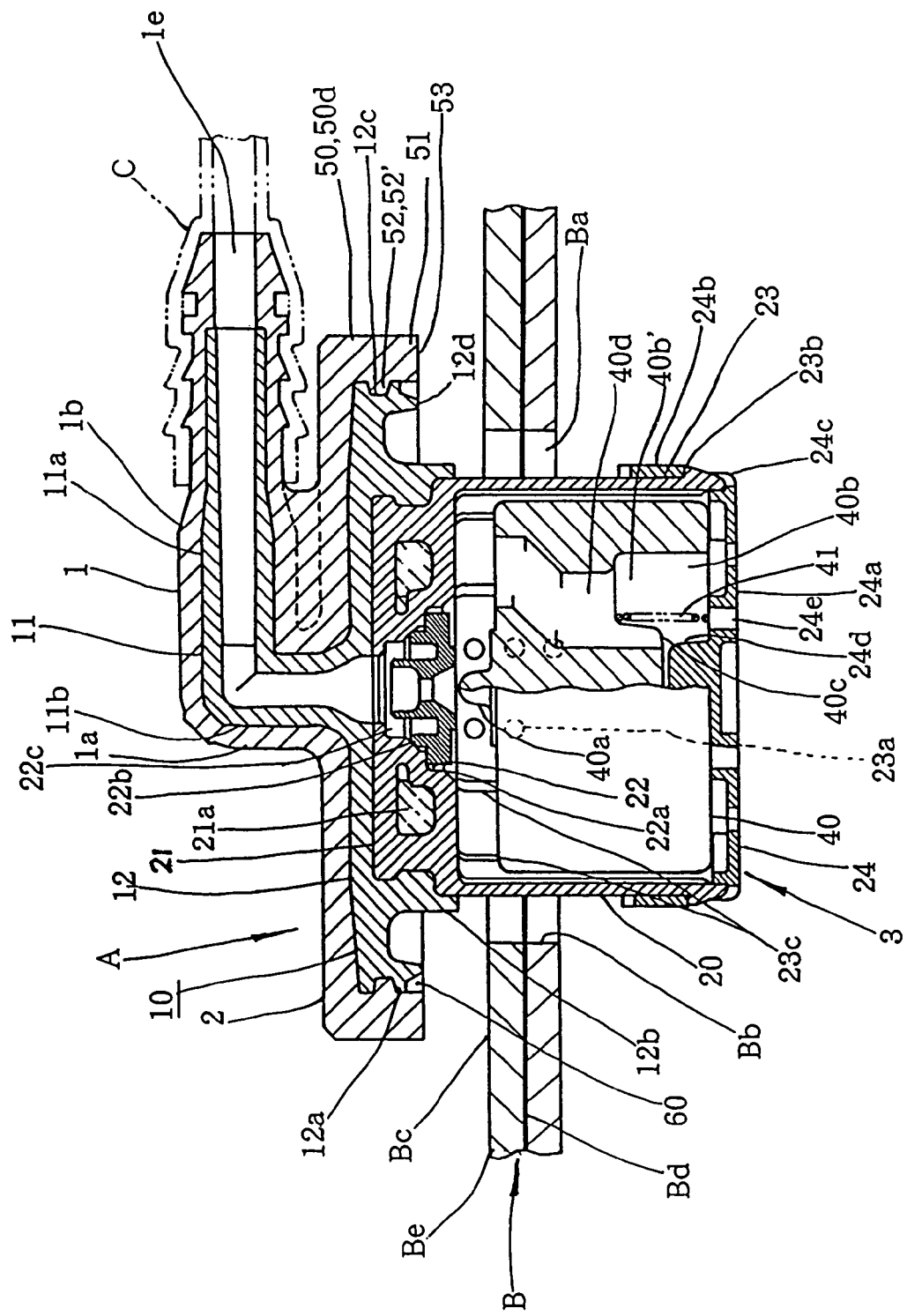
FIG. 13 is a vertical cross-sectional view showing the connector according to the fourth embodiment along with the essential parts of a fuel tank before fitting the connector to the tank (in the line XIII—XIII in FIG. 12)
Figure 14:
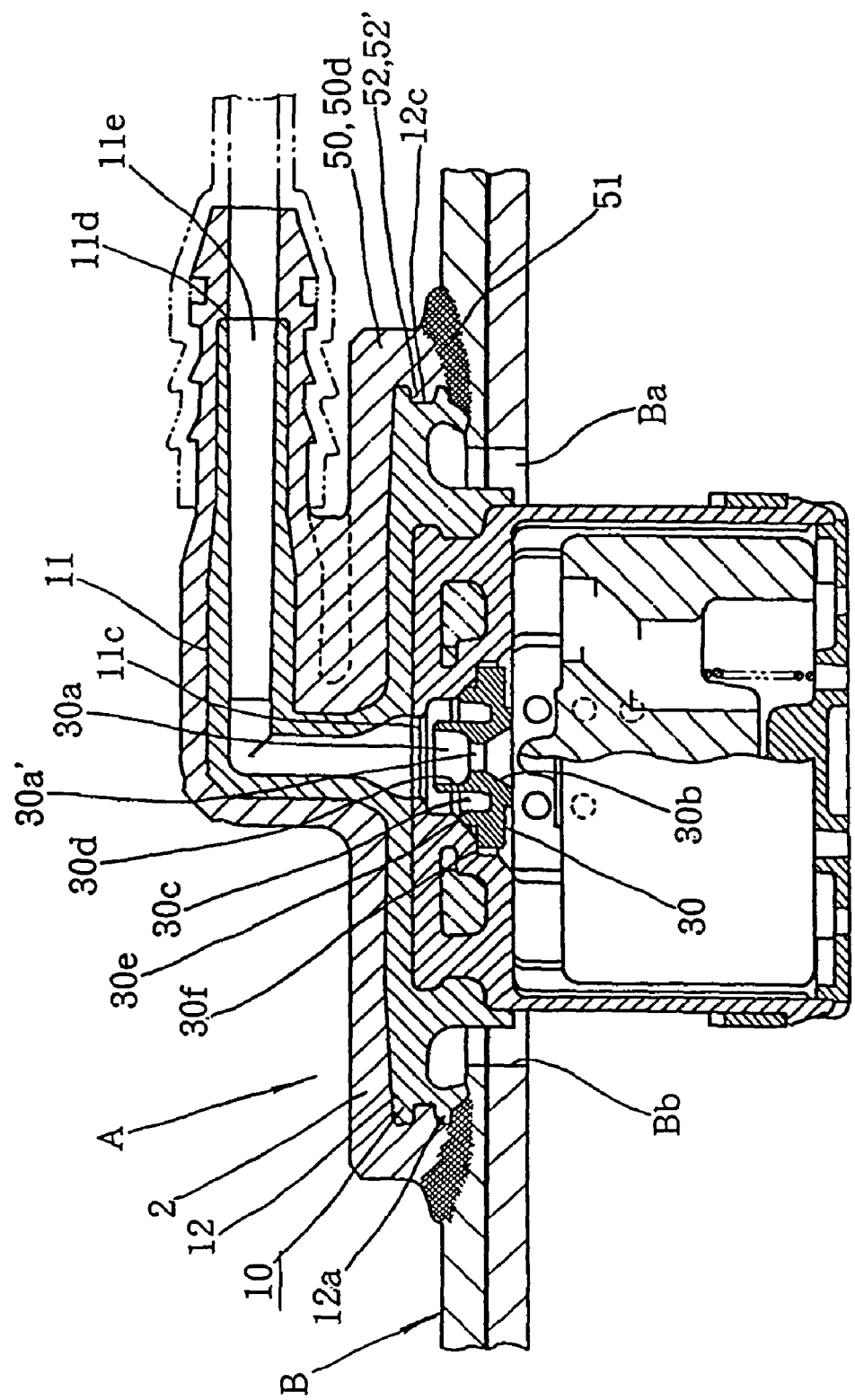
FIG. 14 is a vertical cross-sectional view showing the connector along with the essential parts of the tank after fitting the connector to the tank.
Figure 15:
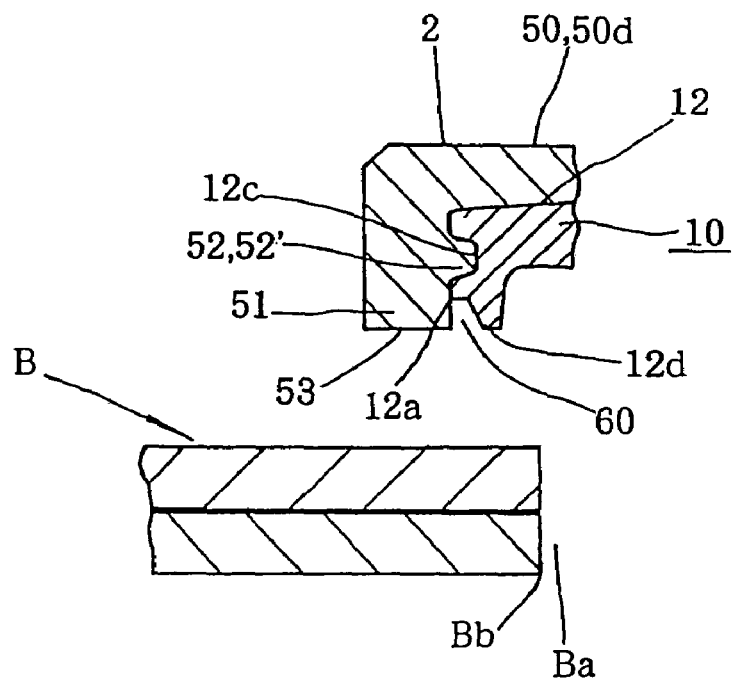
FIG. 15 is a cross-sectional view of the essential parts of the connector according to the fourth embodiment (before fitting to the tank)
Figure 16:
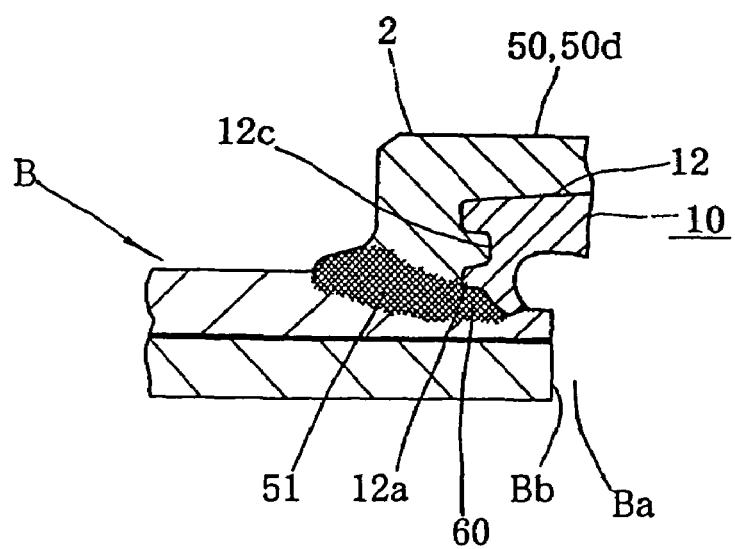
FIG. 16 is a cross-sectional view of the essential parts of the connector (after fitting to the tank)

FIGS. 10–22 show the fuel tank connector A according to a fourth typical embodiment of the present invention. FIGS. 10–12 show the connector A from different views. FIG. 13 is a vertical cross-sectional view of the connector A along with the essential parts of a fuel tank B before the connector A has been fitted to the tank B, and FIG. 14 is a vertical cross-sectional view of the connector A along with the essential parts of the tank B after the connector has been fitted to the tank B. FIG. 15 shows in enlargement a portion of the connector A, which is supposed to be melt-bonded to the tank B in fitting to the tank B. FIG. 16 shows the portion of the connector, which has been melt-bonded to the tank B.

Figure 17:
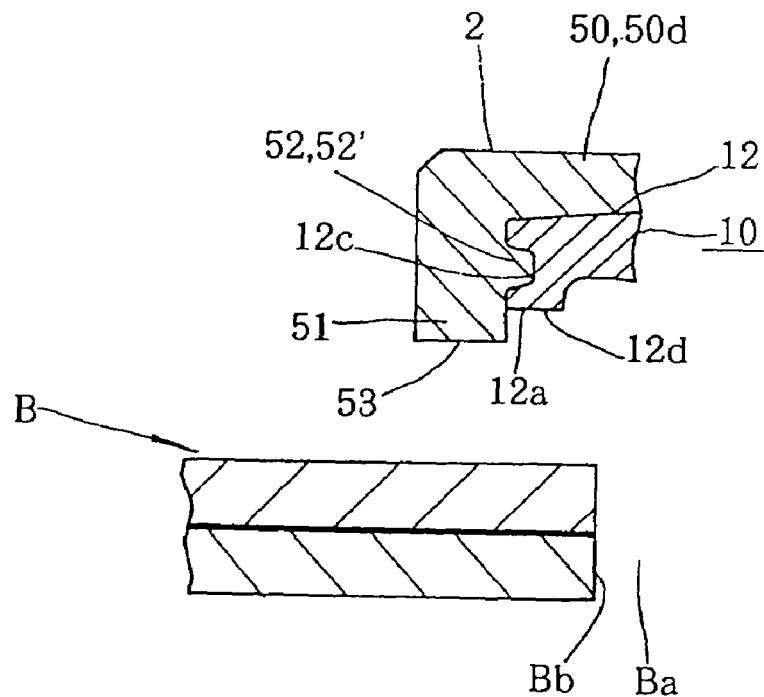
FIG. 17 is a cross-sectional view of the essential parts of a modified form of the connector shown in FIGS. 10–16 (before fitting to the tank)
Figure 18:
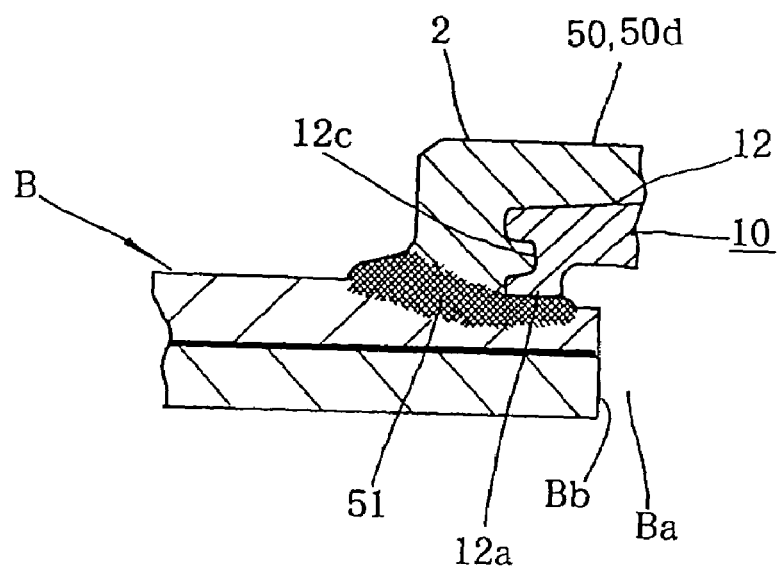
FIG. 18 is a cross-sectional view of the essential parts of the modified form (after fitting to the tank)
Figure 19:
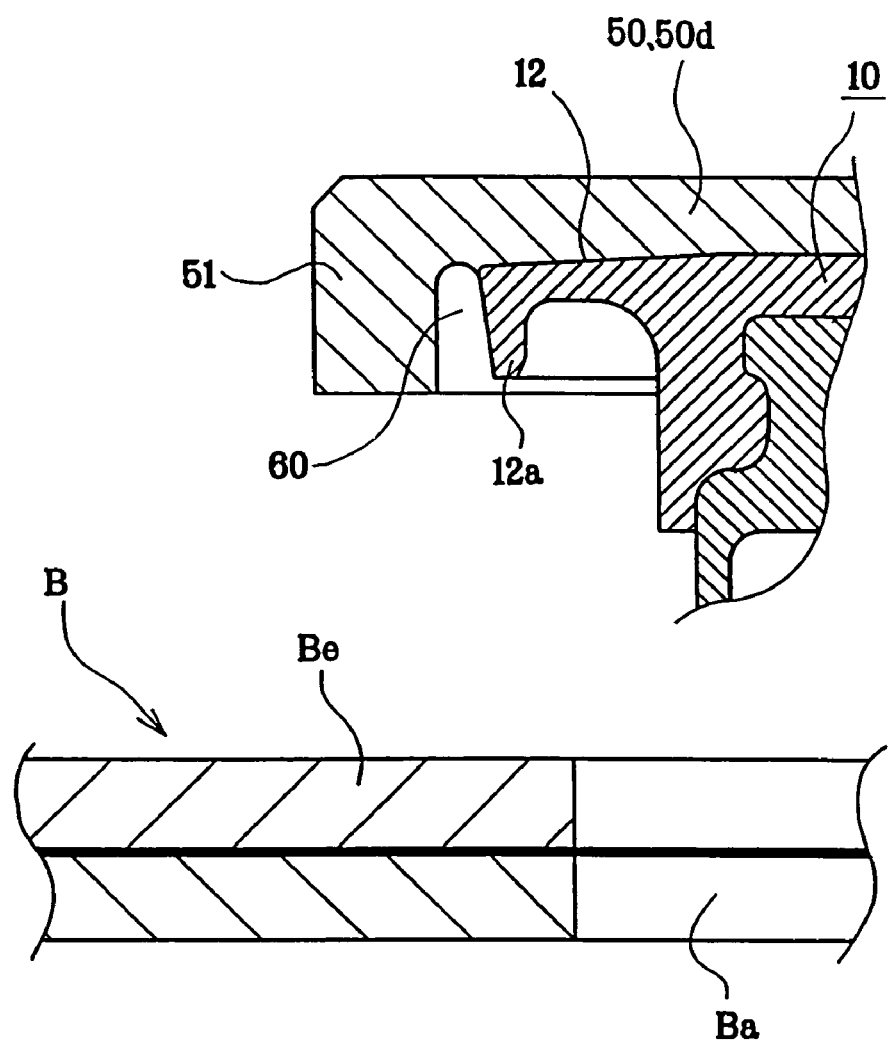
FIG. 19 is a cross-sectional view of the essential parts of another modified form of the connector shown in FIGS. 10–16 (before fitting to the tank)
Figure 20:
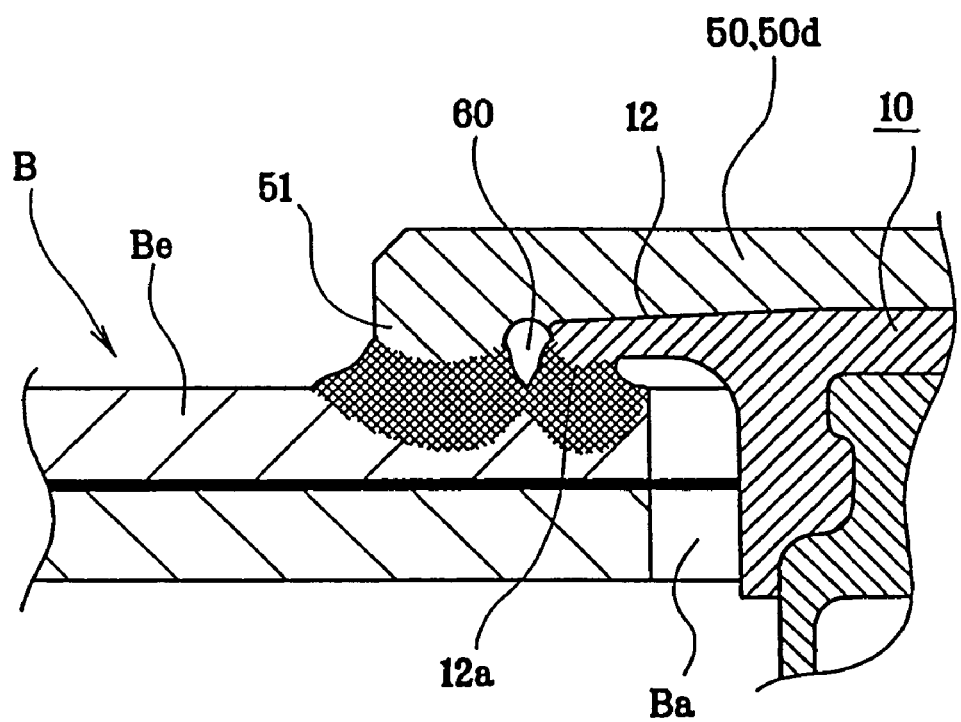
FIG. 20 is a cross-sectional view of the essential parts of the modified form shown in FIG. 19 (after fitting to the tank)
Figure 21:
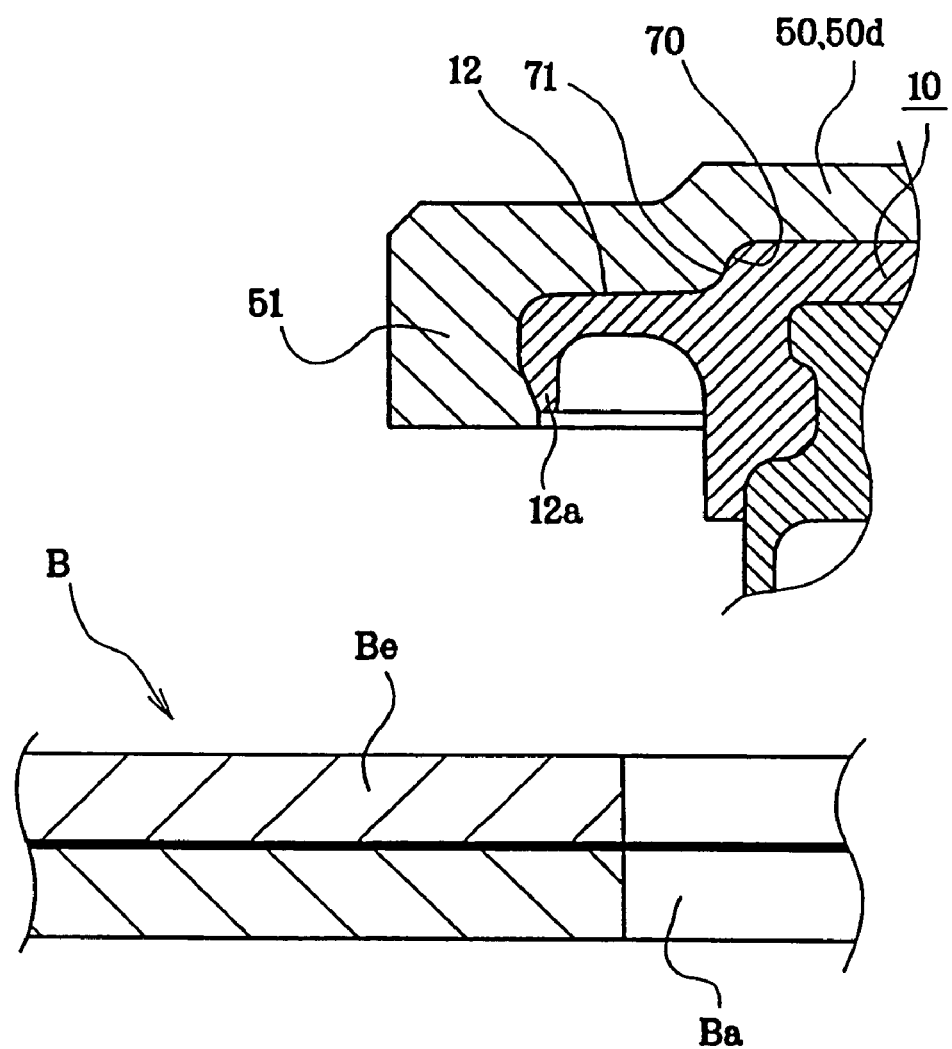
FIG. 21 is a cross-sectional view of the essential parts of another modified form of the connector shown in FIGS. 10–16 (before fitting to the tank)
Figure 22:
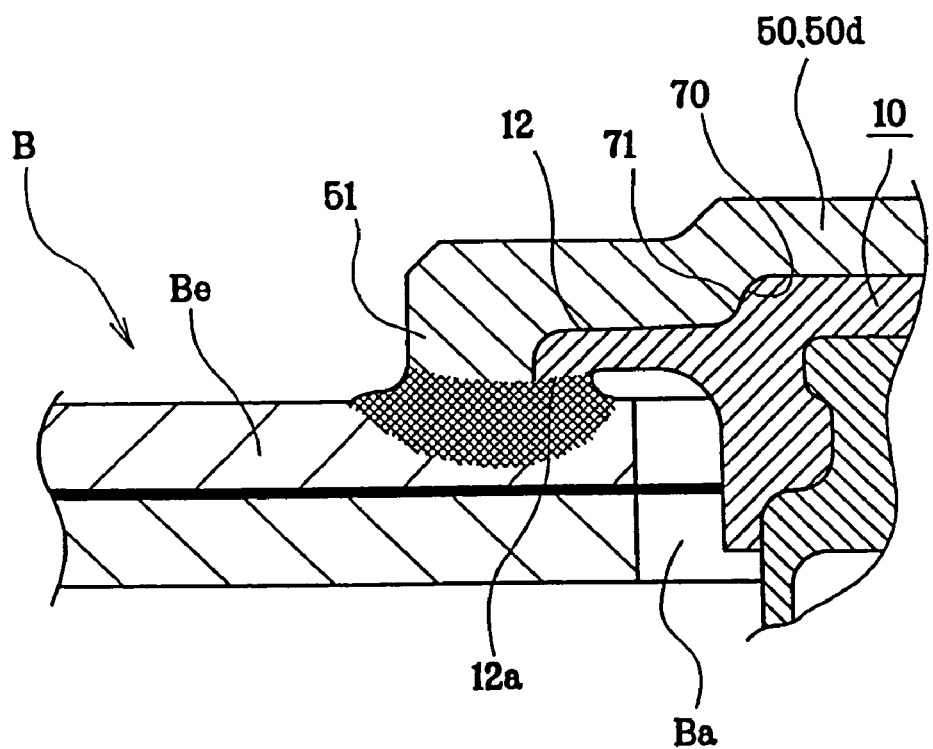
FIG. 22 is a cross-sectional view of the essential parts of the modified form shown in FIG. 21 (after fitting to the tank)
Figure 23:
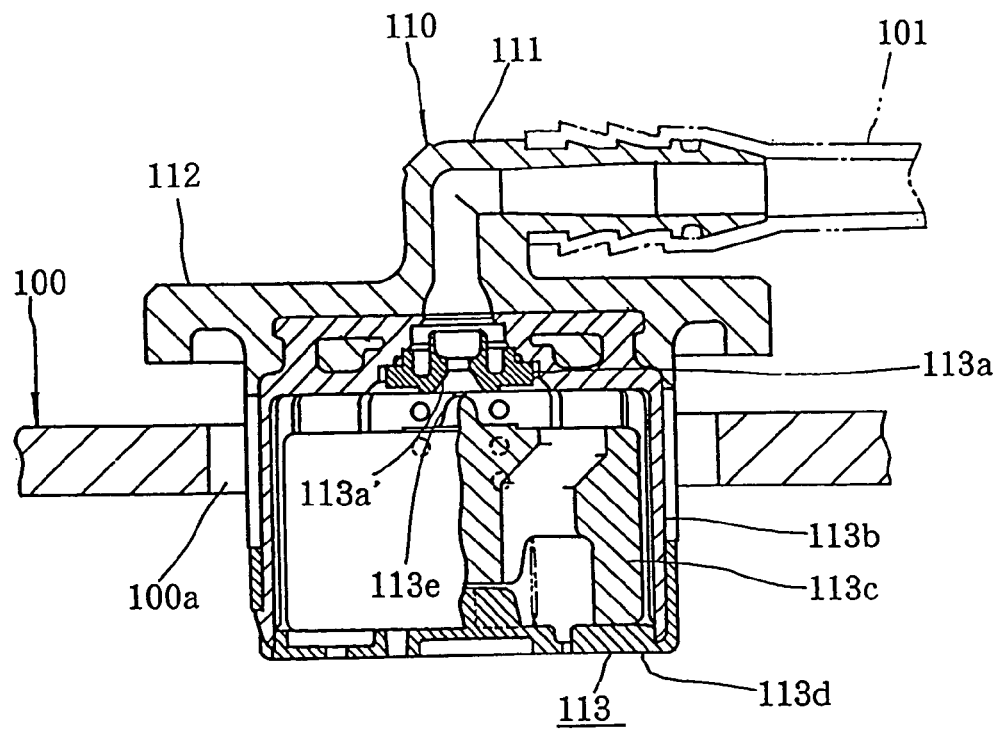
FIG. 23 is a vertical cross-sectional view showing a conventional fuel tank connector along with a fuel tank before fitting the connector to the tank.
Figure 24:
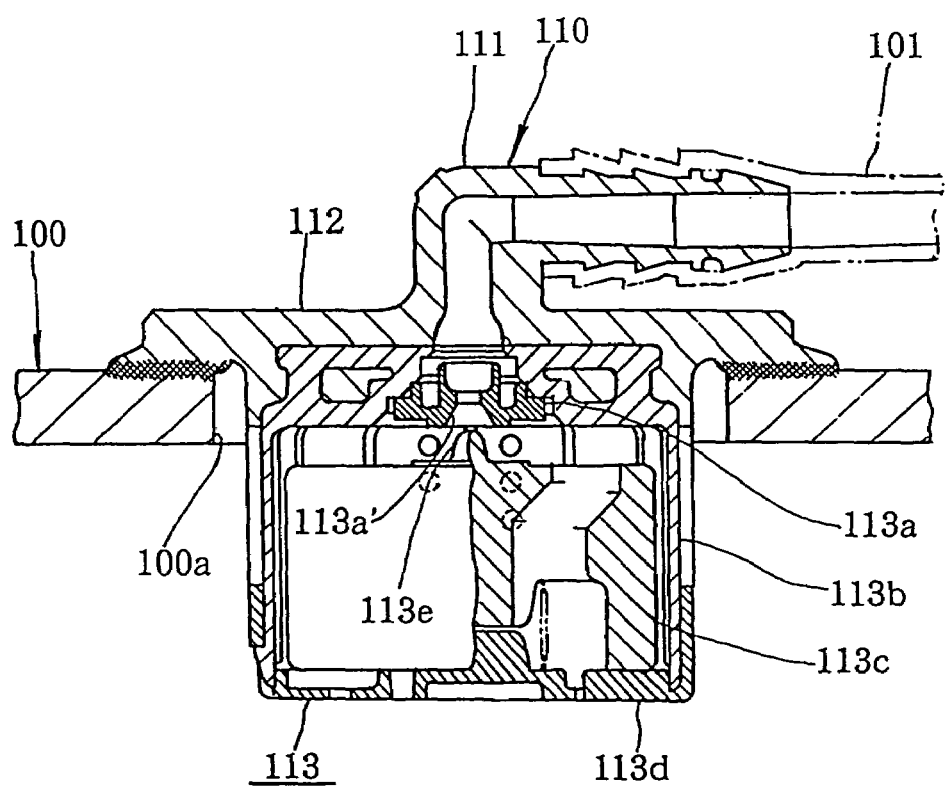
FIG. 24 is a vertical cross-sectional view of the conventional connector along with the tank after fitting the connector to the tank.

FIGS. 17, 19 and 21 show in enlargement a portion of the connector to be melt-bonded to the fuel tank B in each of modified forms of the connector shown in FIGS. 10–16 in order to help understanding the modified forms. FIGS. 18, 20 and 22 show in enlargement the portion of the connector, which has been fitted to the fuel tank B, in each of the modified forms. (FIG. 18 shows how the modified form of FIG. 17 has been melt-bonded to the fuel tank B, FIG. 20 shows how the modified form of FIG. 19 has been melt-bonded to the fuel tank B, and FIG. 22 shows how the modified form of FIG. 21 has been melt-bonded to the fuel tank B.)

The fuel tank connector A according to each of the typical embodiments is adapted to be fitted to an inner area Bc of an opening Ba so as to cover the opening Ba formed in the fuel tank B to connect the fuel tank and a pipe C in communicating fashion. The connector comprises a gas barrier member 10 made of a synthetic resin having a gas barrier property, the gas barrier member including a tubular portion 11 and a flanged portion 12 provided on a peripheral side of the tubular portion 11 and having a greater side than the opening Ba of the fuel tank B. The gas barrier member 10 is made of polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, or polyethylene terephthalate. This arrangement can effectively minimize that evaporative emissions deriving from the fuel in the fuel tank leak from the connector.

The fuel tank connector A may be typically configured to have various required properties, such as fuel oil resistance. The connector is fitted to the inner area Bc of various types of openings Ba formed in the fuel tank B to connect the fuel tank B and various types of pipes C, such as a vent pipe and a fuel feeding pipe.

The fuel tank connector A may be used to connect any type of pipe C to the fuel tank B in such a state that the connector A is provided with any type of valve, such as, a fuel cutoff valve 3, or is provided with no valve.

The gas barrier member 10 forming the fuel tank connector A may be made of polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, or polyethylene terephthalate, which is suitable for use as a material of the fuel tank connector A and is a material difficult to pass gas deriving from any types of fuel stored in the fuel tank B. Any one of the materials can provide the connector A with a typical gas barrier function.

Any one of the synthetic materials, which can form the gas barrier member 10 and has a gas barrier property, is difficult to pass various types of gas deriving from fuel. The following fuel permeability test, which was carried out to compare some of the synthetic materials with high-density polyethylene under identical conditions, shows that any one of the tested synthetic materials were significantly smaller than the tested high-density polyethylene in fuel permeability amount, and that any one of the tested synthetic materials had a gas barrier property superior to the tested high-density polyethylene.

"Fuel Permeability Test"

Respective samples, which were made of the synthetic materials having a gas barrier property as listed above, and samples, which were made of high-density polyethylene as stated, were prepared as samples to be measured. Aluminum cups, which had a diameter of 38 mm, were prepared for each of the samples.

As test chemicals, the following reagents were prepared:
(1) First reagent: Unleaded regular gasoline (corresponding to JIS K2202 No. 2)
(2) Second reagent: Mixed fuel of 90 vol. % of unleaded regular gasoline (corresponding to JIS K2202 No. 2) and 10 vol. % of ethanol The first reagent of 4.6 g or the second reagent of 4.6 g was put in each of the aluminum cups. The respective samples to be measured was fixedly put on the respective aluminum cups so that the respective aluminum cups had their open ends closed with the respective samples to be measured. The fuel permeability test (the fuel permeability test prescribed in JIS Z 0208-76), wherein the fuel permeation amount of a permeable area having 11.341 $cm^2$ was found by measuring a decrease in weight after lapse of 48 hours at a temperature of 60° C. in a gas phase method, shows the results in Table 1.

TABLE 1

| Synthetic resin sample | Reagent | Sample thickness | Permeation amount |
|---|---|---|---|
| Sample made of aromatic polyamide (AMODEL (trademark), AT5001; manufactured by Teijin Amoco Engineering Plastics Co., Ltd. | First reagent 4.6 g | 0.97 mm | 6 mg |
| Sample made of polybutylene terephthalate (DURANEX (trademark) 2002; manufactured by Polyplastics Co., Ltd.) | First reagent 4.6 g | 0.98 mm | 10 mg |
| | Second reagent 4.6 g | 0.98 mm | 8 mg |
| Sample made of a blended polymer of an ethylene-vinyl alcohol copolymer and high-density polyethylene (EVAL (trademark) XEP661; manufactured by Kuraray Co., Ltd.) | First reagent 4.6 g | 0.93 mm | 100 mg |
| | Second reagent 4.6 g | 0.93 mm | 94 mg |
| Sample made of a blended polymer of polyamide and high-density polyethylene (MC8 (tradename); manufactured by Toray Industries, Inc.) | First reagent 4.6 g | 0.96 mm | 0 mg |
| | Second reagent 4.6 g | 0.96 mm | 3 mg |
| Sample made of a blended polymer of polyamide and high-density polyethylene (SP966 (tradename); manufactured by Toray Industries, Inc.) | First reagent 4.6 g | 0.99 mm | 0 mg |
| | Second reagent 4.6 g | 0.99 mm | 14 mg |
| Sample made of high-density polyethylene (KB145 (tradename); manufactured by Nippon Polyolefin Co., Ltd. | First reagent 4.6 g | 0.97 mm | 780 mg |
| | Second reagent 4.6 g | 0.97 mm | 484 mg |

The gas barrier member 10 includes the tubular portion 11 and the flanged portion 12 provided on the peripheral side of the tubular portion 11 and having a greater side than the opening Ba. The gas barrier member may include another part helpful to the fuel tank connector A, if necessary.

The connector A comprises a tubular unit 1 and a flange unit 2 to include the tubular portion 11 and the flanged portion 12 forming the gas barrier member 10. Another part, such as the fuel cutoff valve 3, may be provided at the tubular unit 1 or the flange unit 2, forming the connector A.

The fuel tank B, to which the fuel tank connector A is fitted, may have any structure. For example, the fuel tank B may be constructed so that its entirety is made of a synthetic resin, or it has an outer surface around a peripheral edge Bb of the opening made of a synthetic resin capable of being melt-bonded to the connector A and the other portion made of a suitable material, such as another synthetic resin or metal.

The fuel tank connector A thus constructed may have a peripheral portion of the flanged portion melt-bonded to a synthetic resin Bd having a gas barrier property and forming the fuel tank B to be fitted to the fuel tank, thereby effectively minimize the leakage of evaporative emissions from the fuel tank.

In the fuel tank connector A thus constructed, the gas barrier member 10 may have at least a portion of a surface, typically at least a portion except the inner side of the tubular portion 11, covered with an outer shell portion 50*a* made of an olefin resin having an adhesive property, allowing the gas barrier member 10 with the outer shell portion 50*a* to be melt-bonded to the fuel tank B at the outer shell 50 in reliable and easy fashion, in addition to the advantage stated earlier.

In the fuel tank connector A thus constructed, at least a portion of the outer shell portion 50*a*, which is made of an olefin resin having an adhesive property to cover at least a portion of the gas barrier member 10, and at least a portion of a surface of the gas barrier member 10, which is uncovered with the outer shell portion 50*a*, may be covered with an additional outer shell portion 50*b* made of high-density polyethylene. Thus, the outer shell portion 50*b*, which is made of high-density polyethylene, can be fitted to the gas barrier member 10 in easier and more reliable fashion, allowing the connector A to be fitted to the fuel tank B in more reliable and easier fashion, in addition to the advantages stated earlier.

In the fuel tank connector A thus constructed, the leading end of the flanged portion 12 may be provided with an annular projected portion 12*a*, which projects toward the outer surface of the fuel tank B, increasing design freedom in fitting of the connector to the fuel tank B in such a manner to effectively minimize the leakage of evaporative emissions from the fuel tank B in addition to the advantages stated earlier.

The fuel tank connector A thus constructed may be used as a connector for connection with a fuel feeding pipe to connect the fuel feeding pipe to the fuel tank B in such a manner to effectively minimize the leakage of evaporative emissions from fuel, in addition to the advantages stated earlier.

The fuel tank connector A thus constructed may be used as a connector for connection with a vent pipe to connect the vent pipe to the fuel tank in such a manner to effectively minimize the leakage of evaporative emissions from fuel, in addition to the advantages stated earlier.

The fuel tank connector A thus constructed may further comprise the fuel cutoff valve 3 to connect a pipe C to the fuel tank B through the fuel cutoff valve, effectively minimizing the leakage of evaporative emissions from fuel, in addition to the advantages stated earlier.

(1) Fuel Tank Connector A According to the First Embodiment

First, the fuel tank connector A according to the first embodiment shown in FIGS. 1–3 will be specifically described.

The fuel tank connector A in the shown embodiment is configured as an instrument to connect any type of pipe C to the fuel tank B, and is in particular a fuel tank connector A with the typical fuel cutoff valve 3.

The fuel tank connector A in the shown embodiment is a connector A adapted to be fitted to the inner area Bc of the opening Ba so as to cover, from outside, the opening Ba formed in the fuel tank B to connect the fuel tank B and a pipe C in communicating fashion. The connector A includes the gas barrier member 10, which comprises the tubular portion 11 and the flanged portion 12 provided on the peripheral side of the tubular portion 11 and having a greater side than the opening Ba of the fuel tank B, and which is made of a synthetic resin having a gas barrier property. The gas barrier member 10 is made of polybutylene terephthalate, polyphenylene sulfide, a liquid crystal polymer, aliphatic polyketone, aromatic polyamide, a blended polymer of an ethylenevinyl alcohol copolymer and high-density polyethylene, a blended polymer of polyamide and polyethylene, a blended polymer of polyamide and high-density polyethylene, or polyethylene terephthalate. In the shown embodiment, the gas barrier member 10 has at least a portion of a surface covered with the outer shell 50, more specifically, at least a portion of a surface covered with the outer shell portion 50*a* made of an olefin resin having an adhesive property. Additionally, at least a portion of the outer shell portion 50*a* and at least a portion of the gas barrier member uncovered with the outer shell portion 50*a* are covered with the outer shell portion 50*b* made of high-density polyethylene. The connector A can be melt-bonded to the fuel tank B at the outer shell 50 to effectively minimize that evaporative emissions deriving from the fuel in the fuel tank B leak from the connector.

The fuel tank connector A in the shown embodiment is used as an instrument to connect any type of pipe C to the fuel tank B. In the shown embodiment, the connector A is provided with the typical fuel cutoff valve 3 and is fitted to an upper side of the fuel tank B as a typical example. The connector serves to feed, e.g., evaporative emissions deriving from fuel to a charcoal canister or another device and to prevent the fuel from flowing out when the fuel level in the fuel tank B changes.

In the fuel tank B, to which the connector A in the shown embodiment is fitted, at least a portion of the tank with the outer shell 50 of the connector A melt-bonded thereto, i.e., an outer surface of the tank around the peripheral edge Bb of the opening in the fuel tank B is made of a synthetic resin capable of being melt-bonded to the outer shell 50 and includes a gas barrier layer, i.e., a layer difficult to pass evaporative emissions from the fuel.

The fuel tank B typically includes an outer surface layer Be made of a synthetic resin convenient for melt-bonding with the connector A, such as high-density polyethylene, and the gas barrier layer Bd made of a synthetic resin layer to make it difficult to pass evaporative emissions from the fuel. In the shown embodiment, the outer surface layer Be has a portion removed to provide a circumferential recessed portion Bf around the peripheral edge Bb of the opening so that the gas barrier layer Bd having a gas barrier property is exposed at the circumferential recessed portion.

The connector A in the shown embodiment includes the tubular unit 1 with a bore 1*e*, the flange unit 2 provided on a peripheral side of the tubular unit 1 and having a greater outer diameter than the opening Ba, and the fuel cutoff valve 3. With a cylindrical portion 23 forming a cylindrical body 20 of the fuel cutoff valve 3 inserted into the fuel tank B through the opening Ba of the fuel tank B, the flange unit 2 is melt-bonded to a surface of the fuel tank, which is made of a synthetic resin at least around the peripheral edge Bb of the opening. Thus, the connector A is used for connecting the fuel tank B and a pipe C in communicating fashion through the bore 1*e*.

The opening Ba in the shown embodiment is formed in a circular shape, and the flange unit 2 is formed as circular plate, which has a greater diameter than the opening Ba.

The connector A in the shown embodiment specifically includes the tubular unit 1, which comprises a vertical tubular portion 1*a* projecting upwardly and a horizontal tubular portion 1*b* connected to an upper end of the vertical tubular portion 1*a* so as to be bent from the vertical tubular potion 1*a* at right angles, and the flange unit 2 which comprises the circular plate projecting laterally from a periphery of a lower end of the vertical tubular portion 1*a* in the tubular unit 1. The flange unit additionally includes the fuel cutoff valve 3, which comprises a disk-shaped portion 21 jutted downwardly from the flange unit 2, i.e., in a direction away from the tubular unit 1, the cylindrical portion 23 extending downwardly from a peripheral edge of the disk-shaped portion 21, a lid 24 with an engagement projection 23*b* engaged with an engagement slot 24*c* formed in a lower edge of the cylindrical portion 23, a valve seat unit 30 provided in a recessed portion 22 in the disk-shaped portion 21 in communication with the bore 1*e* in the tubular unit 1, and a float 40 housed in a float chamber so as to be vertically movable in response to a change in the liquid level of the liquid entering the float chamber, the float chamber comprising the disk-shaped portion 21 having the valve seat unit 30 with a valve seat 30*b*, the cylindrical portion 23 and the lid 24. A valve body 40*a*, which is provided on an upper end of the float 40, is configured to get in close contact with the valve seat 30*b* in the valve seat unit 30 to close the bore 1*e* of the tubular unit 1 when the float 40 moves toward the valve seat 30*b* as the liquid level changes.

The gas barrier member 10 provided on the connector A is made of a synthetic resin having a gas barrier property to avoid the transmission of gas, typically evaporative emissions deriving from the fuel in the tank B, as much as possible. Examples of the synthetic resin are polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, and polyethylene terephthalate. In the shown embodiment, the gas barrier member includes the tubular portion 11 with a passage 11*e* forming the bore 1*e* and the flanged portion 12 projecting laterally from the peripheral edge of the one end of the tubular portion 11.

The tubular portion 11 has an elbow-like shape, wherein a vertical tubular portion 11*b* is connected to a horizontal tubular portion 11*a* at right angles. The flanged portion 12 is integrally fitted to the vertical tubular portion 11*b* so as to project laterally from the peripheral portion of the lower end of the vertical tubular portion.

The flanged portion 12, which is provided on the peripheral portion of the vertical tubular portion 11*b*, is configured to have a greater side than the opening Ba in the fuel tank B, i.e., the flanged portion 12 on the tubular portion 11 is configured to laterally extend from the peripheral portion of the tubular portion 11 toward the peripheral edge Bb of the opening in the fuel tank B. Specifically, the flanged portion 12 is formed as a circular plate, which has a greater diameter than the opening Ba in a circular shape.

The annular projected portion 12*a* extends in a bent form downwardly from a side of the flanged portion 12 facing the outer surface of the fuel tank B, i.e., a peripheral edge of the flanged portion 12 remote from the projected tubular portion 11, or toward the fuel tank B.

The fuel cutoff valve 3 is integrally fitted to a lower side of the gas barrier member thus constructed, which is located on a side remote from the projected tubular portion 11.

The fuel cutoff valve 3 includes the cylindrical body 20 having an upper side integrally provided with the disk-shaped portion 21 and integrally fitted to the gas barrier member 10, the valve seat unit 30 integrally fitted to the disk-shaped portion 21 in the cylindrical body 20, the lid 24 fitted to a lower end of the cylindrical portion to close the bottom opening of the cylindrical body 20, and the float 40 housed in the float chamber provided in the cylindrical body 20 closed by the lid 24 for opening and closing the valve seat 30*b* in the valve seat unit 30, following a change in the fuel liquid level.

The cylindrical body 20 forming the fuel cutoff valve 3 includes the disk-shaped portion 21 and the cylindrical portion 23 integrally projected from the disk-shaped portion 21, and the cylindrical body is made of any type of synthetic resin, typically, a synthetic resin having a gas barrier property, such as polyacetal.

The disk-shaped portion 21 forming the cylindrical body 20 has a wall with a cavity 21*a* therein, which communicates with outside to accept the entry of a resin in molding. The disk-shaped portion also has a peripheral edge integrally provided with the cylindrical portion 23, which extends downwardly. Additionally, the disk-shaped portion 21 has a substantially central portion formed with the recessed portion 22, which communicates with the passage 11*e* in the tubular portion 11 and forms an opening 11*c* of the tubular portion 11.

The recessed portion 22 formed in the disk-shaped portion 21 communicates with the passage 11*e* in the tubular portion 11 and has a larger diameter than the passage 11*e*. In the shown embodiment, the recessed portion comprises a large diameter of stepped hole 22*a* formed in a lower end of the disk-shaped portion 21 so as to be upwardly recessed, a conical hole 22*b* extending from an upper end of the stepped hole 22*a* toward the tubular portion 11, and another stepped hole 22*c* extending from the conical hole 22*b* to the tubular portion 11.

The cylindrical portion 23 is formed as a cylindrical and open-bottomed body, which projects from the disk-shaped portion 21 as one unit. The cylindrical portion has an outer portion on a leading side as a lower edge formed with the engagement projection 23*b* for engagement with the lid 24 and a peripheral wall formed with a plurality of holes 23*a*. The cylindrical portion 23 has an inner wall formed with a plurality of guide ribs 23*c*, which extend from a lower portion toward the disk-shaped portion 21.

The holes 23*a* formed in the cylindrical portion 23 serve to smoothly move gas or another fluid between the inner space in the fuel tank B and the inner space in the cylindrical portion 23, which houses the float 40 therein and is closed by the lid 24.

The cylindrical body 20 thus constructed and the gas barrier member 10 are integrally fitted by, e.g., inserting the cylindrical body 20 in a mold, injecting a synthetic resin for molding the gas barrier member 10 into the mold by injection or anther way, and molding the gas barrier member 10 so as to cover a peripheral portion of the disk-shaped portion 21 in the cylindrical body 20 and a side of the disk-shaped portion 21 remote from the projected cylindrical portion 23 with the synthetic resin as well as filling the synthetic resin into the cavity 21*a* in the cylindrical body 21.

In the shown embodiment, the gas barrier member 10 is integrally fitted to the cylindrical body 20 so that the gas barrier member includes the flanged portion 12 covering the side of the disk-shaped portion remote from the projected cylindrical portion 23 and laterally projecting from the side, a covering portion 12*b* projecting from a lower side of the flanged portion 12 so as to cover the peripheral portion of the disk-shaped portion 21, the tubular portion 11 having the passage 11*e* in communication with the stepped hole 22*c* in the disk-shaped portion 21 and upwardly projecting from the upper side of the flanged portion 12, and the annular projected portion 12 downwardly extending from the leading end of the disk-shaped portion 12 in a bent form.

In the shown embodiment, the outer surface of the gas barrier member 10, which is integrally fitted to the cylindrical body, is covered by the outer shell 50, which extends on an outer surface of the covering portion 12*b* and a portion of the outer surface of the gas barrier member 10 from the outer surface of the covering portion to an open end 11*d* through the leading edge of the annular projected portion 12*a*.

The outer shell 50 to be provided on the gas barrier member 10 can be formed on the surface of the gas barrier member 10 by plastics molding wherein the cylindrical body 20 with the gas barrier member 10 integrally fitted thereto is inserted into a mold, for instance.

The outer shell 50, which is provided so as to cover the surface of the gas barrier member 10, can be molded integrally with the gas barrier member 10. The outer shell is made of a synthetic resin capable of being melt-bonded to the fuel tank B. In the shown embodiment, the outer shell has a layered structure, wherein the outer shell integrally includes the outer shell portion 50*a*, which is made of an olefin resin having an adhesive property, and which covers the outer surface of the covering portion 12*b* and a portion of the outer surface of the gas barrier member 10 from the outer surface of the covering portion to a middle portion of the vertical tubular portion 11*b* through the leading edge of the annular projected portion 12*a*, and the outer shell portion 50*b*, which is made of high-density polyethylene, and which covers a peripheral surface of the outer shell portion 50*a* continuous to a surface of the outer shell portion 50*a* facing the fuel tank B, and a surface from the peripheral surface to the open end 11*d* of the tubular portion 11, i.e., the surfaces formed by the outer shell portion 50*a* made of an olefin resin having an adhesive property and the gas barrier member 10.

In other words, in the shown embodiment, the flange unit 2 and the tubular unit 1 of the connector A are provided so that the outer shell 50 is integrally fitted to the flanged portion 12 and the tubular portion 11 in the gas barrier member 10. The flange portion 2 has the leading edge formed with an annular projection 2*a*, which comprises the annular projected portion 12*a* and the outer shell 50 covering the annular projected portion 12*a*.

The valve seat unit 30, which is arranged in the recessed portion 22 of the disk-shaped portion 21 in the cylindrical body 20 to provide the fuel cutoff valve 3 with the valve seat 30*b*, is made of a synthetic resin adapted to melt-bonding to the disk-shaped portion 21 and cooperating with the disk-shaped portion 21 to provide the connector A with a gas barrier function, i.e., any type of synthetic resin having a gas barrier property to effectively avoid the transmission of evaporative emissions deriving from the fuel, such as polyacetal. The valve seat unit has such a form that the valve seat 30*b*, which receives the valve body 40*a* of the float 40 to be closed, is provided on the edge of an aperture 30*a* vertically passing through the valve seat 30*b* and is incorporated into the recessed portion 22.

Specifically, the valve seat body 30 has the aperture 30*a* formed in a substantially central portion to vertically pass therethrough and communicate with the bore 1*e* or the passage 11*e*. The aperture 30*a* has a central portion formed with a restricted orifice 30*a*' and a portion below the restricted orifice 30*a*' formed with the conical valve seat 30*b* gradually expanding toward a lower edge of the aperture 30*a*. The valve seat body 30 has an upper end formed with an annular groove 30*c* to surround the aperture 30*a*. The annular groove 30*c* provides a cylindrical part 30*d* to an upper central portion of the valve seat body 30. The outer wall of the annular groove 30*c* forming the cylindrical part 30*d* comprises an upper disk part 30*e* and a lower disk part 30*f* provided below the upper disk part 30*e* and having a greater diameter than the upper disk part 30*e*. The valve seat body 30 is melt-bonded and integrally fitted to the disk-shaped portion 21 so that the upper disk part 30*e* has an upper end pressed against the conical hole 22*b* with an annular seal 31 fitted to the outer peripheral surface of the upper disk part 30*e*, and so that the lower disk part 30*f* is housed in the larger diameter of stepped hole 22*a* at the lowest position so as to put the upper end of the lower disk part 30*f* into close contact with the upper end of the larger diameter of stepped hole 22*a*.

The float 40, which is incorporated in the cylindrical body 20 thus constructed, is made of, e.g., polyacetal and is guided by the guide ribs 23*c* in the cylindrical portion 23 to be vertically movable in smooth fashion, following a change in the fuel liquid level. The float has the upper end formed with the valve body 40*a* to get in close contact with the valve seat 30*b* to close the aperture 30*a* in the valve seat body 30 when the float is moved toward the valve seat 30*b* by a change in the fuel liquid level. The float has a substantially central portion on a lower side formed with a recess 40*b* upwardly extending, and the recess 40*b* includes an annular recess 40*b*' further upwardly extending and a circular base 40*c*. The float includes a hole 40*d* formed therein to communicate between the recess 40*b* and the upper end of the float.

The lid 24, which keeps the float 40 forming the fuel cutoff valve 3 incorporated in the cylindrical portion 23, includes a cylindrical peripheral wall 24*b*, which upwardly extends from a peripheral edge of a bottom wall 24*a* in a circular plate shape. The cylindrical peripheral wall 24*b* receives the cylindrical portion 23 so as to get the leading edge of the cylindrical portion 23 in contact with the bottom wall 24*a*, and the cylindrical portion 23 has the engagement projection 23*b* thereon engaged with an edge of the engagement slot 24*c* in the cylindrical peripheral wall 24*b* to assemble the lid to the cylindrical portion 23. The lid 24 has a substantially central portion on an inner side formed with a circular base 24*d*, and a helical compression spring 41 is disposed on the circular base 24*d* of the lid and the circular base 24*c* of the float 40 to assemble the float 40 to the cylindrical portion 23 so that the float is easily movable in floating fashion in the cylindrical portion, following a change in the fuel liquid level.

The lid 24, which assembles the float 40 into the cylindrical portion 23, has the bottom wall 24*a* formed with a plurality of apertures 24*e*, which vertically pass through the bottom wall 24*a*, allowing fuel or gas to easily flow into and out of the cylindrical portion 23.

When the float 40 does not receive the buoyancy from the fuel liquid, the helical compression spring 41 balances with the weight of the float 40 and elastically supports the float 40 so as to maintain the valve body 40*a* in a position away from the valve seat 30*b*. When the float 40 receives the buoyancy from the fuel liquid, the helical compression spring allows the float 40 to float up easily and move upwardly by the buoyancy. In the latter case, the helical compression spring causes the float 40 to press its valve body 40*a* into contact with the valve seat 30*b* against the buoyancy, e.g., if the vehicle with the fuel tank turns over.

In the connector A, which includes the tubular unit 1 and the flange unit 2 comprising the outer shell 50 and the gas barrier member 10 thus constructed and also includes the fuel cutoff valve 3, the valve seat unit 30 is integrally melt-bonded and fitted to the disk-shaped portion 21 forming the fuel cutoff valve 3. The cylindrical portion 23 has the float 40 housed therein and the lid 24 fitted to the open bottom thereof with the helical compression spring 41 interposed between the housed float 40 and the lid.

In the shown embodiment, the connector A thus constructed has the side of the cylindrical portion 23 inserted into the fuel tank B through the opening Ba formed in the upper side of the fuel tank B. The annular projected portion 12*a* of the gas barrier member 10 in the connector A is melt-bonded to the synthetic resin Bd having a gas barrier property exposed in the circumferential recessed portion Bf formed in the fuel tank B. The annular projected portion 2*a* is housed in the circumferential recessed portion Bf so as to be melt-bonded to the fuel tank B. The annular projected portion 12*a* is melt-bonded to the synthetic resin Bd having a gas barrier property, and the outer shell 50 has the annular projected portion 2*a* melt-bonded to the fuel tank B.

By fitting the connector A to the inner area Bc of the opening formed in the fuel tank B as explained, the gas barrier member 10 can effectively decrease the leakage of evaporative emissions deriving from the fuel from the fuel tank B.

The connector A can be easily and reliably fitted to the fuel tank B since fitting the connector A to the fuel tank B is carried out by melt-bonding the connector A to the fuel tank B.

The leakage of the gas from the fuel tank B can be further effectively decreased since the connector A is fitted to the fuel tank B by melt-bonding the gas barrier member 10 in the connector A to the synthetic resin Bd having a gas barrier property in the fuel tank B.

The connector A, which has been fitted to the fuel tank B as explained, may be used for connection with a suitable pipe C.

In order to that the connector A can easily and reliably maintain the connection with the pipe C, the tubular unit 1 of the connector has an outer peripheral surface of the horizontal tubular portion 1*b* formed with a plurality of ridges, which comprise conical guides 1*c* having a diameter gradually reduced toward the open end of the tubular unit and vertical stepped surfaces 1*d* extending from respective edges of the conical guides remote from the open end to the outer peripheral surface of the horizontal tubular portion 1*b*, in the shown embodiment.

(2) Fuel Tank Connector A According to the Second Embodiment

Next, the fuel tank connector A according to the second embodiment shown in FIGS. 4–6 will be specifically described.

The fuel tank connector A in the shown embodiment is configured as an instrument to connect any type of pipe C to the fuel tank B, and is in particular a fuel tank connector A with the typical fuel cutoff valve 3, which is fitted to the upper side of the fuel tank B.

The fuel tank connector A in the shown embodiment is a connector A adapted to be fitted to the inner area Bc of the opening Ba so as to cover, from outside, the opening Ba formed in the fuel tank B to connect the fuel tank B and a pipe C in communicating fashion. The connector A includes the gas barrier member 10, which comprises the tubular portion 11 and the flanged portion 12 provided on the peripheral side of the tubular portion 11 and having a greater side than the opening Ba of the fuel tank B, and which is made of a synthetic resin having a gas barrier property. The gas barrier member 10 is made of polybutylene terephthalate, polyphenylene sulfide, a liquid crystal polymer, aliphatic polyketone, aromatic polyamide, a blended polymer of an ethylenevinyl alcohol copolymer and high-density polyethylene, a blended polymer of polyamide and polyethylene, a blended polymer of polyamide and high-density polyethylene, or polyethylene terephthalate. In the shown embodiment, the gas barrier member 10 has at least a portion of a surface covered with the outer shell 50, more specifically, at least a portion of a surface covered with an outer shell portion 50*a* made of an olefin resin having an adhesive property. The connector A can be melt-bonded to the fuel tank B at the outer shell 50 to effectively minimize that evaporative emissions deriving from the fuel in the fuel tank B leak from the connector.

The fuel tank connector A according to the second embodiment as the same structure or substantially the same structure as the fuel tank connector A according to the first embodiment except that the outer shell 50 is made of a single layer of adhesive olefin resin and is provided on the gas barrier member 10 forming the fuel tank connector A according to the second embodiment. The connector according to the second embodiment can be fitted to the fuel tank A by the same method as the connector according to the first embodiment.

Parts identical to or substantially identical to the parts of the fuel tank connector A according to the first embodiment are designated by like reference numerals, and explanation on these parts will be omitted.

In the fuel tank connector A according to the second embodiment, the outer shell 50, which is supposed to be the gas barrier member 10, may be provided on the gas barrier member 10 by, e.g., plastics molding, wherein the cylindrical body 20 with the gas barrier member 10 integrally provided thereto is inserted into a mold as in the preparation for the fuel tank connector A according to the first embodiment.

The outer shell 50, which is provided so as to cover the surface of the gas barrier member 10, can be molded integrally with the gas barrier member 10. The outer shell is made of a synthetic resin capable of being melt-bonded to the fuel tank B. In the shown embodiment, the outer shell includes the outer shell portion 50*a*, which is made of an olefin resin having an adhesive property, and which covers the outer surface of the covering portion 12*b* and a portion of the outer surface of the gas barrier member 10 from the outer surface of the covering portion to the open end 11*d* of the tubular portion 11 through the leading edge of the annular projected portion 12a so as to be integral with the gas barrier member 10.

In the shown embodiment, the connector A thus constructed has the side of the cylindrical portion 23 inserted into the fuel tank B through the opening Ba formed in the upper side of the fuel tank B. The annular projected portion 12a of the bas barrier member 10 in the connector A is melt-bonded to the synthetic resin Bd having a gas barrier property exposed in the circumferential recessed portion Bf formed in the fuel tank B. The annular projected portion 2a is housed in the circumferential recessed portion Bf and is melt-bonded to the fuel tank B. The annular projected portion 12a is melt-bonded to the synthetic resin Bd having a gas barrier property, and the outer shell 50 has the annular projected portion 2a melt-bonded to the fuel tank B.

By fitting the connector A to the inner area Bc of the opening formed in the fuel tank B as explained, the gas barrier member 10 can effectively decrease the leakage of evaporative emissions deriving from the fuel from the fuel tank B.

The connector A can be easily and reliably fitted to the fuel tank B since fitting the connector A to the fuel tank B is carried out by melt-bonding the connector A to the fuel tank B.

The leakage of the gas from the fuel tank B can be further effectively decreased since the connector A is fitted to the fuel tank B by melt-bonding the gas barrier member 10 in the connector A to the synthetic resin Bd having a gas barrier property in the fuel tank B.

(3) Fuel Tank Connector A According to the Third Embodiment

First, the fuel tank connector A according to the third embodiment shown in FIGS. 7–9 will be specifically described.

The fuel tank connector A in the shown embodiment is configured as an instrument to connect any type of pipe C to a fuel tank B, and is in particular a fuel tank connector A with the typical fuel cutoff valve 3.

The fuel tank connector A in the shown embodiment is a connector A adapted to be fitted to the inner area Bc of the opening Ba so as to cover, from outside, the opening Ba formed in the fuel tank B to connect the fuel tank B and a pipe C in communicating fashion. The connector A includes the gas barrier member 10, which comprises the tubular portion 11 and the flanged portion 12 provided on a peripheral side of the tubular portion 11 and having a greater side than the opening Ba of the fuel tank B, and which is made of a synthetic resin having a gas barrier property. The gas barrier member 10 is made of polybutylene terephthalate, polyphenylene sulfide, a liquid crystal polymer, aliphatic polyketone, aromatic polyamide, a blended polymer of an ethylenevinyl alcohol copolymer and high-density polyethylene, a blended polymer of polyamide and polyethylene, a blended polymer of polyamide and high-density polyethylene, or polyethylene terephthalate. In the shown embodiment, the gas barrier member 10 has at least a portion of a surface covered with the outer shell 50, more specifically, s side facing the fuel tank B integrally fitted with an outer shell portion 50c made of a modified polyolefin resin having an adhesive property. The connector A can be melt-bonded to the fuel tank B at the outer shell portion 50c to effectively minimize that evaporative emissions deriving from the fuel in the fuel tank B leak from the connector.

The fuel tank connector A in the shown embodiment is used as an instrument to connect any type of pipe C to the fuel tank B. In the shown embodiment, the connector A is provided with the typical fuel cutoff valve 3 and is fitted to the upper side of the fuel tank B as a typical example. The connector serves to feed, e.g., evaporative emissions deriving from fuel to a charcoal canister or another device and to prevent the fuel from flowing out when the fuel level in the fuel tank B changes.

In the fuel tank B, to which the connector A in the shown embodiment is fitted, at least a portion of the tank with the connector A melt-bonded thereto, i.e., an outer surface of the tank around the peripheral edge Bb of the opening in the fuel tank B is made of a synthetic resin capable of being melt-bonded to an outer shell 50 and includes a gas barrier layer, i.e., a layer difficult to pass evaporative emissions from the fuel.

The fuel tank B typically includes the outer surface layer Be made of a synthetic resin convenient for melt-bonding with the connector A, such as polyethylene and high-density polyethylene, and the gas barrier layer Bd made of a synthetic resin layer to make it difficult to pass evaporative emissions from the fuel. In the shown embodiment, the outer surface layer Be has a portion removed to provide the circumferential recessed portion Bf around the peripheral edge Bb of the opening so that the gas barrier layer Bd having a gas barrier property is exposed at the circumferential recessed portion.

In the shown embodiment, the gas barrier member 10, which forms the connector A fitted to the fuel tank B, includes the tubular portion 11 and the flanged portion 12 provided on the peripheral side of the tubular portion 11 and having a greater side than the opening Ba of the fuel tank B. The gas barrier member also includes a cylindrical portion 23 forming the fuel cutoff valve 3 and having a relatively large diameter. The gas barrier member 10 is made of polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, or polyethylene terephthalate.

The tubular portion 11 forming the gas barrier member 10 in the shown embodiment includes a vertical tubular portion 11b vertically projecting from the flanged portion 12 and a horizontal tubular portion 11a rectangularly connected to the vertical tubular portion 11b at right angles. The tubular portion also includes a tubular projected portion 11f, which downwardly projects from the flanged portion 12 and communicates with the vertical tubular portion 11b. The tubular projected portion 11f has a lower edge formed with a valve seat 11f' as a recessed portion provided at a lower end of a passage 11e in the tubular portion.

The flanged portion 12, which is provided on a peripheral portion of the vertical tubular portion 11a, is configured to have a greater side than the opening Ba formed in the fuel tank B. In other words, the flanged portion 12 provided on the tubular portion 11 is provided so as to extend from the peripheral portion of the tubular portion 11 toward a lateral portion of the peripheral edge Bb of the opening formed in the fuel tank B. More specifically, the flanged portion 12 is formed in a circular plate shape, and the flanged portion 12 is configured to have a greater diameter than the opening Ba formed in a circular shape.

The flanged portion 12 thus constructed has an outer peripheral edge on a side facing the outer surface of the fuel tank B, i.e., on a projecting side of the projected tubular portion 11f, formed with an annular projected portion 12a', which projects in a bent shape downwardly, i.e., toward the fuel tank B.

The gas barrier member 10 thus constructed has a lower side, i.e., the projecting side of the projected tubular portion 11f, formed integrally with the cylindrical portion 23 forming the fuel cutoff valve.

The cylindrical portion 23 forming the fuel cutoff valve 3 is formed an open-bottomed cylindrical body, which is formed integrally with the flanged portion 12 so as to project downwardly from the lower side of the flanged portion 12 and to surround the tubular projected portion 11f. The cylindrical portion has an outer portion on a leading side as a lower edge formed with an engagement projection 23b for engagement with a lid 24. The cylindrical portion has a peripheral wall formed with a plurality of apertures 23a. The cylindrical portion 23 has an inner wall formed with a plurality of guide ribs 23c, which extend from a lower portion toward the flanged portion 12.

The apertures 23a formed in the cylindrical portion 23 provides a structure wherein gas or other fluid can smoothly move between the inner space of the fuel tank B and the inner space of the cylindrical portion 23, which has the float 40 housed therein and is closed by the lid 24.

The outer shell 50 is integrally fitted to the gas barrier member 10 so as to be continuously fitted to an upper peripheral surface of the cylindrical portion 23 in the gas barrier member 10, a surface of the flanged portion 12 continuous to the upper peripheral surface, and an inner surface of the annular projected portion 12a' continuous to the surface of the flanged portion 12. The connector A can be melt-bonded and fitted to the fuel tank B by use of the outer shell 50.

The outer shell 50 in the shown example is integrally provided with a cylindrical part 53 fitted to the upper peripheral surface of the cylindrical portion 23, a flange part 52 fitted to a lower side of the flanged portion 12, and a projected part 54 fitted to the inner surface of the annular projected portion 12a' and projecting further downwardly than the annular projected portion 12a'. When the projected part 54 has a leading end melt-bonded to the circumferential recessed portion Bf of the fuel tank B, the annular projected portion 12a' has a leading end gotten in close contact with the outer surface of the fuel tank B.

The outer shell 50 forming the connector A may be fitted to the gas barrier member 10 by any one of various types of methods. For example, the outer shell can be integrally fitted to the gas barrier member 10 by, e.g., inserting the gas barrier member 10 in a mold and injecting a synthetic resin into the mold.

For example, even if the gas barrier member 10 is made of polybutylene terephthalate having a superior gas barrier property, the outer shell 50 can be integrally fitted to the gas barrier member 10 in reliable fashion since the outer shell 50 is typically formed as the outer shell portion 50c made of a modified polyolefin resin and having an adhesive property. The connector A with the outer shell portion 50c can be fitted to the fuel tank B since the outer shell portion can be properly melt-bonded to the synthetic resin of the fuel tank B, such as polyethylene and high-density polyethylene.

The outer shell 50 can be also properly melt-bonded to the synthetic resin Bd having a gas barrier property in the fuel tank B to fit the connector A to the fuel tank B since the outer shell 50 forming the connector A is formed as the outer shell portion 50c made of a modified polyolefin resin having an adhesive property as explained.

In the connector A including the outer shell 50 thus constructed and the gas barrier member 10, the tubular portion 11 in the gas barrier member 10 forms a tubular unit 1 of the connector A, and the outer shell 50 and the gas barrier member 10 form a flange unit 2 of the connector A laterally projecting from the tubular unit 1. The flange unit 2 has a projecting edge provided with an annular projected portion 2a', which projects toward the fuel tank B and is formed from the annular projected portion 12a' and the projected portion 54. In the shown embodiment, the flange portion 2 has a lower side provided with the typical fuel cutoff valve 3.

The float 40 forming the fuel cutoff valve 3 is made of, e.g., polyacetal. The float is housed in the cylindrical portion 23 so as to be guided by the guide ribs 23c and is vertically movable in smooth fashion, following a change in the fuel liquid level. The float has the upper end provided with the valve body 40a, which gets in close contact with the valve seat 11f' to close the passage 11e in upper movement. The float has a substantially central portion on a lower side formed with the recess 40b extending upwardly. The recess 40b has the annular recess 40b' extending further upwardly. The recess 40b also has the circular base 40c formed therein. The float also has the hole 40d formed therein so as to communicate between the recess 40b and the upper end of the float 40.

The lid 24, which keeps the float 40 forming the fuel cutoff valve 3 in an incorporated state in the cylindrical portion 23, includes a cylindrical peripheral wall 24b upwardly extending from a peripheral edge of a bottom wall 24a formed in a circular plate. The cylindrical peripheral wall 24b houses the cylindrical portion 23 so as to get a leading edge of the cylindrical portion 23 in touch with the bottom wall 24a. The lid is assembled to the cylindrical portion 23 by engaging the engagement projection 23b formed on the cylindrical portion 23 with an edge of an engagement slot 24c formed in the cylindrical peripheral wall 24b. By a helical compression spring 41 disposed on a circular base 24d formed at a substantially central portion on an inner side of the lid 24 and on the circular base 40c of the float 40, the float 40 can float up so as to be easily movable in the cylindrical portion 23, following a change in fuel the liquid level.

The lid 24, which incorporates the float 40 into the cylindrical portion 23, has the bottom wall 24a formed with a plurality of apertures 24e vertically passing therethrough, allowing fuel or gas to easily flow into and out of the cylindrical portion 23.

When the float 40 does not receive the buoyancy from the fuel liquid, the helical compression spring 41 balances with the weight of the float 40 and elastically supports the float 40 so as to maintain the valve body 40a in a position away from the valve seat 11f'. When the float 40 receives the buoyancy from the fuel liquid, the helical compression spring allows the float 40 to float up easily and move upwardly by the buoyancy. In the latter case, the helical compression spring causes the float 40 to press its valve body 40a into contact with the valve seat 11f' against the buoyancy, e.g., if the vehicle with the fuel tank turns over.

In the connector A, which includes the tubular unit 1 and the flange unit 2 comprising the outer shell 50 and the gas barrier member 10 thus constructed and also includes the fuel cutoff valve 3, the cylindrical portion 23 has the float 40 housed therein and the lid 24 fitted to the open bottom thereof with the helical compression spring 41 interposed between the housed float 40 and the lid.

The connector A thus constructed includes the tubular unit 1 with the passage 11e, the flange unit 2 provided on the peripheral portion of the tubular unit 1 and having a greater side than the opening Ba, and the fuel cutoff valve 3. With the cylindrical portion 23 of the fuel cutoff valve 3 inserted into the fuel tank B through the opening Ba of the fuel tank B, the flange unit 2 is melt-bonded to a surface of the fuel tank, which is made of a synthetic resin at least around the peripheral edge Bb of the opening. Thus, the connector A is used for connecting the fuel tank B and a pipe C in communicating fashion through the passage 11e.

The opening Ba in the shown embodiment is formed as a circular opening, and the flange unit 2 is formed in a circular plate shape and has a greater diameter than the opening Ba.

The connector A in the shown example includes the tubular portion 1, which specifically comprises the vertically tubular portion 11b projecting upwardly, the horizontal tubular portion 11a connected to an upper end of the vertical tubular portion 11b so as to be bent from the vertical tubular portion 11b at right angles, and the tubular projected portion 11f forming the valve seat 11f'. The connector also includes the flange unit 2, which is formed in a circular plate shape and laterally extends from a lower peripheral portion of the vertical tubular portion 11b in the tubular unit 1. Additionally, the flange unit includes the fuel cutoff valve 3. In other words, the connector includes the cylindrical portion 23 downwardly projecting from the lower side of the flange unit 2, the lid 24 fitted by engaging the engagement slot 24c with the engagement projection 23b formed on a lower edge of the cylindrical portion 23, the tubular projected portion 11f projecting from the lower side of the flange unit 2 so as to communicate with the vertical tubular portion 11b and having the lower edge formed with the recessed valve seat 11f', and the float 40 housed in a float chamber formed by the flange unit 2 having the tubular projected portion 11f with the valve seat 11f', the cylindrical portion 23 and the lid 24 so as to be vertically movable in response to a change in the liquid level of a liquid entering the float chamber. The float 40 has the upper side formed with the valve body 40a, which gets in contact with the valve seat 11f' in the tubular projected portion 11f to close the passage 11e in the tubular portion 1, following upward movement of the float 40 caused by a change in the fuel liquid level.

The connector A thus constructed has the side of the cylindrical portion 23 inserted into the fuel tank B through the opening Ba formed in the upper side of the fuel tank B. While the annular projected portion 12a' of the gas barrier member 10 in the annular projected portion 2a' is caused to abut against the outer surface of the fuel tank B, the projected portion 54, which comprises the outer shell 50 in the annular projected portion 2a' to be housed in the circumferential recessed portion Bf formed in the fuel tank B, has a leading edge melt-bonded to the surface of the circumferential recessed portion Bf to fit the connector to the fuel tank B.

By fitting the connector A to the inner area Bc of the opening formed in the fuel tank B as explained, the gas barrier member 10 can effectively decrease the leakage of evaporative emissions deriving from the fuel from the fuel tank B since the annular projected portion 12a' formed by the gas barrier member 10 is gotten in close contact with the surface of the fuel tank B.

The gas barrier member 10 may be made of a synthetic resin having a superior gas barrier property, such as polybutylene terephthalate, since the outer shell 50 is made of a modified polyolefin resin having an adhesive property.

The connector A, which has been fitted to the fuel tank B as explained, may be used for connection with a suitable pipe C.

In order to that the connector A can easily and reliably maintain the connection with the pipe C, the tubular unit 1 of the connector has an outer peripheral surface of the horizontal tubular portion 11a formed with a plurality of ridges, which comprise conical guides 1c having a diameter gradually reduced toward the open end of the tubular unit and vertical stepped surfaces 1d extending from respective edges of the conical guides remote from the open end to the outer peripheral surface of the horizontal tubular portion 11a, in the shown embodiment.

(4) Fuel Tank Connector A According to the Fourth Embodiment

Next, the fuel tank connector A according to the fourth embodiment shown in FIGS. 10–18 will be specifically described.

The fuel tank connector A in the shown embodiment is configured as an instrument to connect any type of pipe C to a fuel tank B, and is in particular a fuel tank connector A with the typical fuel cutoff valve 3.

The fuel tank connector A in the shown embodiment is a connector A adapted to be fitted to an inner area Bc of an opening Ba so as to cover, from outside, the opening Ba formed in the fuel tank B to connect the fuel tank B and a pipe C in communicating fashion. The connector A includes the gas barrier member 10, which comprises the tubular portion 11 and the flanged portion 12 provided on a peripheral side of the tubular portion 11 and having a greater side than the opening Ba of the fuel tank B, and which is made of a synthetic resin having a gas barrier property. The gas barrier member 10 is made of polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, or polyethylene terephthalate. In the shown embodiment, the gas barrier member 10 has at least a portion of a surface covered with the outer shell 50, more specifically, at least a portion of a surface covered with an outer shell portion 50d made of polyethylene or high-density polyethylene. The connector A can effectively minimize that evaporative emissions deriving from the fuel in the fuel tank B leak from the connector.

The fuel tank connector A in the shown embodiment is used as an instrument to connect any type of pipe C to the fuel tank B. In the shown embodiment, the connector A is provided with the typical fuel cutoff valve 3 and is fitted to the upper side of the fuel tank B as a typical example. The connector serves to feed, e.g., evaporative emissions deriving from fuel to a charcoal canister or another device and to prevent the fuel from flowing out when the fuel level in the fuel tank B changes.

In the fuel tank B, to which the connector A in the shown embodiment is fitted, at least a portion of the tank with the outer shell 50 of the connector A melt-bonded thereto, i.e., an outer surface of the tank around a peripheral edge Bb of the opening in the fuel tank B is made of a synthetic resin capable of being melt-bonded to the outer shell 50 and includes a gas barrier layer, i.e., a layer difficult to pass evaporative emissions from the fuel.

The fuel tank B typically includes an outer surface layer Be made of a synthetic resin convenient for melt-bonding with the connector A, such as high-density polyethylene, and the gas barrier layer Bd made of a synthetic resin layer to make it difficult to pass evaporative emissions from the fuel.

The connector A in the shown embodiment includes the tubular unit 1 with a bore 1e, the flange unit 2 provided on a peripheral portion of the tubular unit 1 and having a greater side than the opening Ba, and the fuel cutoff valve 3. With the cylindrical portion 23 of the fuel cutoff valve 3 inserted into the fuel tank B through the opening Ba of the fuel tank B, the flange unit 2 has a leading end melt-bonded to a surface of the fuel tank, which is made of a synthetic resin at least around the peripheral edge Bb of the opening. Thus, the connector A is used for connecting the fuel tank B and a pipe C in communicating fashion through the bore 1e.

The opening Ba in the shown embodiment is formed as a circular opening, and the flange unit 2 is formed in a circular plate shape and has a greater diameter than the opening Ba.

More specifically, the connector A in the shown embodiment includes the tubular unit 1, which comprises a vertical tubular portion 1a projecting upwardly and a horizontal tubular portion 1b connected to an upper end of the vertical tubular portion 1a so as to be bent from the vertical tubular portion 1a at right angles. The connector also includes the flange unit 2, which is formed in a circular plate shape and projects laterally from a lower outer peripheral portion of the vertical tubular portion 1a in the tubular unit 1. The flange unit is provided with the fuel cutoff valve 3, which comprises the disk-shaped portion 21 jutted downwardly from the flange unit 2 on a lower side of the flange unit 2, i.e., on a side of the flange unit opposite to the tubular unit 1, the cylindrical portion 23 projecting downwardly from a peripheral edge of the disk-shaped portion 21, the lid 24 having the engagement slot 24c engaged with the engagement projection 23b formed on a lower end of the cylindrical portion 23 to be fitted to the cylindrical portion, and the valve seat unit 30 provided in the recessed portion 22 of the disk-shaped portion 21 so as to communicate with the bore 1e in the tubular unit 1. The fuel cutoff valve also comprises the float chamber formed by the disk-shaped portion 21 having the valve seat unit 30 with a valve seat 30b, the cylindrical portion 23 and the lid 24, and the float 40 housed in the float chamber so as to be vertically movable in response to a change in the liquid level of a liquid entering into the float chamber. The float 40 has the upper side formed with the valve body 40a, which gets in close contact with the valve seat 30b in the valve seat unit 30 to close the bore 1e in the tubular unit 1 when the float 40 moves toward the valve seat 30b, following a change in the fuel liquid level.

The gas barrier member 10 provided on the connector A is made of a synthetic resin having a gas barrier property to avoid the transmission of gas, typically evaporative emissions deriving from the fuel in the tank B, as much as possible. Examples of the synthetic resin are polybutylene terephthalate, polyphenylene sulfide, a liquid crystal polymer, aliphatic polyketone, aromatic polyamide, a blended polymer of an ethylene-vinyl alcohol copolymer and high-density polyethylene, a blended polymer of polyamide and polyethylene, a blended polymer of polyamide and high-density polyethylene, and polyethylene terephthalate. In the shown embodiment, the gas barrier member includes the tubular portion 11 with a passage 11e forming the bore 1e and the flange portion 12 projecting laterally from the peripheral edge of the one end of the tubular portion 11.

The tubular unit 11 includes a vertical tubular portion 11b and a horizontal tubular portion 11a connected to the vertical tubular portion 11b at right angles, which provide an elbow-like shape. The tubular portion 11 is integrally formed with the flanged portion 12, which projects laterally from the lower outer peripheral portion of the vertical tubular portion 11b.

The flanged portion 12, which is provided on the outer peripheral portion of the vertical tubular portion 11b, has a greater side than the opening Ba in the fuel tank B. In other words, the flanged portion 12, which is provided on the tubular portion 11, extends from the outer peripheral portion of the tubular portion 11 toward a lateral side of the peripheral edge Bb of the opening in the fuel tank B. Specifically, the flanged portion 12 is formed in a circular plate-like shape, and the flanged portion 12 has a greater diameter than the opening Ba, which is formed in a circular shape.

The flanged portion 12 thus constructed has an annular projected portion 12a projected from an outer peripheral edge thereof on a side thereon facing the fuel tank B, i.e., a side thereof opposite to the projected tubular portion 11 so as to extend in a bent shape downwardly, i.e., toward the fuel tank B.

The gas barrier member 10 thus constructed has a lower side, i.e., a side opposite to the projected tubular portion 11, fitted integrally with the fuel cutoff valve 3.

The fuel cutoff valve 3 includes the cylindrical body 20 having the upper end integrally provided with the disk-shaped portion 21 so as to be integral with the gas barrier member 10, the valve seat unit 30 integrally fitted in the disk-shaped portion 21 of the cylindrical body 20, and the lid 24 fitted to the lower end of the open-bottomed cylindrical portion 23 in the cylindrical body 20. The fuel cutoff valve also includes the float 40, which is housed in the float chamber provided in the cylindrical body closed by the lid 24, and which opens and closes the valve seat 30b in the valve unit 30, following a change in the fuel liquid level.

The cylindrical body 20 forming the fuel cutoff valve 3 includes the disk-shaped portion 21 and the cylindrical portion 23 integrally provided on the disk-shaped portion 21 so as to project therefrom. The cylindrical body may be made of any type of synthetic resin, typically a synthetic resin having a gas barrier property, such as polyacetal.

The disk-shaped portion 21 forming the cylindrical unit 20 has the cavity 21a formed therein so as to communicate with outside and accept a molding resin. The disk-shaped portion has the cylindrical portion 23 integrally provided thereon to extend downwardly from the outer peripheral edge thereof. The disk-shaped portion 21 has a substantially central portion formed with the recessed portion 22, which communicate with the passage 11e in the tubular portion 11 and form the opening 11c of the tubular portion 11.

The recessed portion 22 formed in the disk-shaped portion 21 communicates with the passage 11e in the tubular portion 11 and has a greater diameter than the passage 11e. In the shown embodiment, the recessed portion comprises the larger diameter of stepped hole 22a formed in a lower portion of the disk-shaped portion 21 so as to extend upwardly, the conical hole 22b extending from the upper end of the larger diameter of stepped hole 22a toward the tubular portion 11, and the additional stepped hole 22c extending from the conical hole 22b to the tubular portion 11.

The cylindrical portion 23 is formed as an open-bottomed cylindrical member, which projects from the disk-shaped portion 21 as being integral therewith. The cylindrical portion has the outer portion on the leading edge as the lower edge formed with the engagement projection 23b for engagement with the lid 24. The cylindrical portion has the outer peripheral wall formed with the plural apertures 23a and the inner wall formed with the plural guide ribs 23c so as to extend from a lower portion of the inner wall of the cylindrical portion toward the disk-shaped portion 21.

The apertures 23a formed in the cylindrical portion 23 provide a structure wherein fluid, such as gas, can smoothly move between the inner space of the fuel tank B and the inner space in the cylindrical portion 23, which houses the float 40 therein and is closed by the lid 24.

The cylindrical body 20 thus constructed and the gas barrier member 10 are integrally fitted by, e.g., inserting the cylindrical body 20 in a mold, injecting a synthetic resin for molding the gas barrier member 10 into the mold by injection or anther way, and molding the gas barrier member 10 so as to cover a peripheral portion of the disk-shaped portion 21 in the cylindrical body 20 and a side of the disk-shaped portion 21 remote from the projected cylindrical portion 23 with the synthetic resin as well as filling the synthetic resin into the cavity 21a in the cylindrical body 21.

In the shown embodiment, the gas barrier member 10 is integrally fitted to the cylindrical body 20 so as to include the flanged portion 12 covering a side of the disk-shaped portion 21 opposite to the cylindrical portion 23 and projecting laterally from the side, the covering portion 12b projecting from a lower side of the flanged portion 12 so as to cover a circumferential surface of the disk-shaped portion 21, the tubular portion 11 projecting upwardly from an upper side of the flanged portion 12 so as to have the passage 11e in communication with the additional stepped hole 22c in the disk-shaped portion 21, and the annular projected portion 12a extending downwardly from a leading edge of the flanged portion 12 so as to have a bent shape.

The gas barrier member 10, which is integrally fitted to the cylindrical body, has an outer surface thereof, i.e., an outer surface thereof from the outer surface of the annular projected portion 12a to the open end 11d of the tubular portion 11 in the shown embodiment, covered by the outer shell 50, which made of polyethylene or high-density polyethylene.

The outer shell 50 to be provided on the gas barrier member 10 can be formed on the surface of the gas barrier member 10 by plastics molding, wherein the cylindrical body 20 with the gas barrier member 10 integrally fitted thereto is inserted into a mold, for instance.

In the shown embodiment, the flange unit 2 and the tubular unit 1 of the connector A is formed so that the outer shell 50 is integrally fitted to the flanged portion 12 and the tubular portion 11 in the gas barrier member 10. The flange unit 2 has a leading edge provided with an annular projected portion 51, which is formed by the annular projected portion 12a and the outer shell 50 covering the annular projected portion 12a.

When the gas barrier member 10 of the connector A is made of a blended polymer of polyamide and polyethylene or a blended polymer of polyamide and high-density polyethylene, the integration between the gas barrier member 10 and the outer shell 50 made of polyethylene or high-density polyethylene becomes better. In this case, the connector can be conveniently melt-bonded to the fuel tank B as well.

The valve seat unit, which is provided in the recessed portion 22 of the disk-shaped portion 21 in the cylindrical unit 20 and provides the valve seat 30b of the fuel cutoff valve 3, is made of a synthetic resin providing a gas barrier function to the connector A together with the disk-shaped portion 21, i.e., any type of synthetic resin having a gas barrier property capable of effectively avoiding the transmission of evaporative emissions from the fuel, such as polyacetal. The valve seat unit has such a structure wherein the valve seat 30b, which receives the valve body 40a of the float 40 to be closed, is provided on the edge of the aperture 30a vertically passing through the valve seat unit. The valve seat unit can be incorporated in the recessed portion 22.

In other words, the valve seat unit 30 has the aperture 30a formed in a substantially central portion so as to vertically pass therethrough in communication with the bore 1e (11e). The aperture 30a comprises the smaller diameter of orifice 30a' at a central portion, the conical valve seat 30b extending downwardly from the smaller diameter of aperture 30a' and having a diameter gradually increased toward the lower edge of the aperture 30a, and the annular groove 30c provided on the upper side of the valve seat unit 30 so as to surround the aperture 30a. The annular groove 30c provides the cylindrical part 30d on a central portion of the upper side of the valve seat unit 30. The outer wall of the annular groove 30c forming the cylindrical part 30b forms the upper disk-like part 30e. The valve seat unit has a lower side than the upper disk-like portion 30e formed as a lower disk-like portion 30f having a greater diameter than the upper disk-like portion 30e. The valve seat unit 30 is melt-bonded and integrally fitted to the disk-shaped portion 21, housing the lower disk-like portion 30f in the larger diameter stepped hole 22a at the lowest position so that the upper disk-like portion 30e has the upper end pressed against the conical hole 22b, and the lower disk-like portion 30f has the upper end gotten in close contact with the upper end of the larger diameter of stepped hole 22a.

The float 40, which is incorporated into the cylindrical body 20 thus constructed, made of, e.g., polyacetal. The float is housed in the cylindrical portion 23 so as to be guided by the guide ribs to be vertically movable in smooth fashion, following a change in the fuel liquid level. The float has the upper side provided with the valve body 40a, which gets in contact with the valve seat 30b to close the aperture 30a of the valve seat unit 30 in upward movement toward the valve seat 30b, following a change in the fuel liquid level. The float has a substantially central portion on the lower side formed with the recess 40b upwardly extending. The float has the annular recess 40b' provided in the recess 40b so as to extend further upwardly. The float also has the circular base 40c formed in the recess 40b. The float has the hole 40d communicating between the recess 40b and the upper end surface of the float 40. The lid 24, which keeps the float 40 forming the fuel cutoff valve 3 in an incorporated state in the cylindrical portion 23, includes the cylindrical peripheral wall 24b, which extends upwardly from the peripheral edge of the bottom wall 24a in a circular plate shape. The lid receives the cylindrical portion 23 in the cylindrical peripheral wall 24b so as to get the leading edge of the cylindrical portion 23 in touch with the bottom wall 24a. The lid is fitted to the cylindrical portion 23 by engaging the engagement projection 23b provided on the cylindrical portion 23 with an edge of the engagement slot 24c formed in the cylindrical peripheral wall 24b. By the helical compression spring 41, which is disposed on the circular base 24d provided on the substantially central portion on the inner side of the lid 24 and on the circular base 40c on the float 40, the float 40 can easily float up and move in the cylindrical portion 23, following a change in the fuel liquid level.

The lid 24, which incorporates the float 40 into the cylindrical portion 23, has the bottom wall 24a formed with the plural apertures 24e vertically passing therethrough, allowing fuel or gas to easily flow in and out of the cylindrical portion 23.

When the float 40 does not receive the buoyancy from the fuel liquid, the helical compression spring 41 balances with the weight of the float 40 and elastically supports the float 40 so as to maintain the valve body 40*a* in a position away from the valve seat 30*b*. When the float 40 receives the buoyancy from the fuel liquid, the helical compression spring allows the float 40 to float up easily and move upwardly by the buoyancy. In the latter case, the helical compression spring causes the float 40 to press its valve body 40*a* into contact with the valve seat 30*b* against the buoyancy, e.g., if the vehicle with the fuel tank turns over.

In the connector A, which includes the tubular unit 1 and the flange unit 2 comprising the outer shell 50 and the gas barrier member 10 thus constructed and also includes the fuel cutoff valve 3, the valve seat unit 30 is integrally melt-bonded and fitted to the disk-shaped portion 21 forming the fuel cutoff valve 3. The cylindrical portion 23 has the float 40 housed therein and the lid 24 fitted to the open bottom thereof with the helical compression spring 41 interposed between the housed float 40 and the lid.

In the shown embodiment, the connector A thus constructed has the side of the cylindrical portion 23 inserted into the fuel tank B through the opening Ba formed in the upper side of the fuel tank B. The annular projected portion 12*a* of the gas barrier member 10 and the annular projected portion 51 in the connector A are melt-bonded to the fuel tank B.

By fitting the connector A to the inner area Bc of the opening formed in the fuel tank B as explained, the gas barrier member 10 can effectively decrease the leakage of evaporative emissions deriving from the fuel from the fuel tank B.

The connector A can be easily and reliably fitted to the fuel tank B since fitting the connector A to the fuel tank B is carried out by melt-bonding the connector A to the fuel tank B.

In this embodiment, the annular projected portion 51, which is provided on the outer shell 50 made of polyethylene or high-density polyethylene and projects toward the outer surface of the fuel tank B so as to cover the leading edge of the flanged portion 12 of the gas barrier member 10, is melt-bonded to the fuel tank. While the gas barrier member 10 can effectively decrease the leakage of evaporative emissions from the fuel tank B, the connector A can be fitted to, with high melt-bonding strength ensured, to the fuel tank B, which has the outer surface layer Be made of polyethylene or high-density polyethylene.

In this embodiment, the outer shell 50 made of polyethylene or high-density polyethylene is formed on the gas barrier member 10 in such a state that a projection 52, which is provided on one of the annular projected portion 51 of the outer shell 50 made of polyethylene or high-density polyethylene and the leading end of the flanged portion 12 of the gas barrier member 10, bites into the other one of the annular projected portion 51 and the leading portion of the flanged portion 12.

In this embodiment, specifically, the annular projected portion 12*a*, which is formed on the leading edge of the flanged portion 12 of the gas barrier member 10, has an outer side formed with an annular groove 12*c*, and the annular projected portion 51 of the outer shell 50 has an inner side formed with an annular projection 52' bitten into the annular groove 12*c*. In other words, in this embodiment, a molding process, wherein the annular groove 12*c* is formed in the outer side of the annular projected portion 12*a* of the gas barrier member 10, is carried out to obtain a partly molded product with the gas barrier member 10 thus molded, and then, the partly molded product is used as an insert to mold the outer shell 50, forming the annular projection 52' on the inner side of the annular projected portion 51 of the outer shell 50 so as to be bitten in the annular groove 12*c*.

Thus, the integration between the annular projected portion 12*a* formed on the leading edge of the flanged portion 12 in the gas barrier member 10 and the annular projected portion 51 of the outer shell 50 can be ensured with high level in this embodiment. In particular, when both of the annular projected portions 12*a* and 51 are heated and melted by a heating plate for melt-bonding, both of the annular projected portions 12*a* and 51 can be melt-bonded to the fuel tank B, being adequately melted in a planned range.

The projection 52 may be formed on the outer side of the annular projected portion 12*a* of the gas barrier member 10. In this case, the outer shell 50 is formed so as to have the projection 52 bitten therein.

The projection 52 may comprise a plurality of projections, which are provided in discontinuous fashion so as to be located along the inner area Bc of the opening formed in the fuel tank B.

In this embodiment, the annular projected portion 12*a* formed on the leading edge of the flanged portion 12 in the gas barrier member 10, and the annular projected portion 51 of the outer shell 50 made of polyethylene or high-density polyethylene project downwardly by substantially the same length. In other words, both of the annular projected portion 12*a* and 51 have projected surfaces 12*d* and 53 facing the outer surface of the fuel tank B positioned substantially flush with each other.

The annular projected portion 12*a* of the gas barrier member 10 and the annular projected portion 51 of the outer shell 50 made of polyethylene or high-density polyethylene have a space 60 formed therebetween so as to open toward the outer surface of the fuel tank B.

Specifically, in this embodiment, the annular projected portion 12*a* of the gas barrier member 10 is formed so that an outer surface of the annular projected portion 12*a* between the annular groove 12*c* formed in the outer side of the annular projected portion 12*a* and the projected surface 12*d* of the annular projected portion 12*a* forms a slant surface toward the peripheral edge Bb of the opening of the fuel tank B so as to have a size gradually enlarged toward the projected surface 12*d*. The annular projected portion 51 of the outer shell 50 has an inner surface facing the slant surface extending substantially perpendicular to the outer surface of the fuel tank B, thus providing the space 60 in an annular shape between the slant surface and the inner surface.

In this embodiment, when the annular projected portion 51 of the outer shell 50 is heated and melted, the melted material of polyethylene or high-density polyethylene forming the annular projected portion 50 can come into the space 60. As a result, the melt-bonding strength with respect to the fuel tank B having the outer surface layer Be made of, in particular, high-density polyethylene can be further improved since the annular projected portion 50 can be melt-bonded to the fuel tank B, spreading the melted material of polyethylene or high-density polyethylene in a wide range.

Unlike in the example shown in FIGS. 10–16, the annular projected portion 12*a* provided on the flanged portion 12 in the gas barrier member 10 may project so as to have a smaller projecting length than the annular projected portion 51 of the outer shell 50 made of polyethylene or high-density polyethylene (FIG. 17).

In other words, the projected surface 12*d* of the annular projected portion 12*a* in the gas barrier member 10 is lower (i.e., lower in a direction away from the outer surface of the fuel tank B) than the projected surface 53 of the annular projected portion 51 in the outer shell 50, which faces the outer surface of the fuel tank B as shown in FIG. 17.

In this case, when the annular projected portion 51 in the outer shell 50 is heated and melted, the melted material forming the annular projected portion 51 and made of polyethylene or high-density polyethylene can come into between the projected surface 12d of the annular projected portion 12a in the gas barrier member 10 and the outer surface of the fuel tank B. The melt-bonding strength with respect to the fuel tank B having the outer surface layer Be made of, in particular, high-density polyethylene can be further improved since the annular projected portion 51 can be melt-bonded to the fuel tank B, spreading the melted material of polyethylene or high-density polyethylene in a wide range in this case as well.

Unlike in the example shown in FIGS. 10–16, the melt-bonding may be carried out so as to leave some part of the space 60 unfilled even after the annular projected portion 51 in the outer shell 50 has been melt-bonded to the fuel tank B (FIG. 19 and FIG. 20).

In the example shown in FIG. 20, both of the annular projected portion 51 in the outer shell 50 and the annular projected portion 12a in the gas barrier member 10 are melt-bonded to the outer surface layer Be of the fuel tank B made of high-density polyethylene, and the space 60 is formed so as to have an enough size to prevent the space 60 from being fully filled by the melt-bonding.

In this case, even if the gas barrier member 10 is swollen by fuel or evaporative emissions from the fuel, the unfilled part of the space 60 can absorb the swell to make it difficult that the melt-bonded portion between the annular projected portion 51 in the outer shell 50 and the fuel tank B has a force reducing the melt-bonding strength applied thereto.

Unlike in the example shown in FIGS. 10–16, the upper side of the gas barrier member 10, which is covered by the outer shell 50 made of polyethylene or high-density polyethylene, may be stepped to have a stepped surface 70 facing the leading edge of the flanged portion 12 in the gas barrier member 10 (FIG. 21 and FIG. 22).

In the example shown in FIG. 22, both of the annular projected portion 51 in the outer shell 50 and the annular projected portion 12 in the gas barrier member 10 are melt-bonded to the outer surface layer Be of the fuel tank B made of high-density polyethylene, and the upper side of the gas barrier member 10 thus melt-bonded is stepped so as to have the stepped surface 70 facing the leading edge of the flanged portion 12 in the gas barrier member 10. The outer shell 50 has an opposed inner surface 71 formed accordingly so as to be in contact with the stepped surface 70.

Even if the gas barrier member 10 is swollen by the fuel or evaporation emissions from the fuel in the fuel tank connector thus constructed, the opposed inner surface 71 of the outer shell 50 made of polyethylene or high-density polyethylene in contact with the stepped surface 70 can receive the force caused by the swell to disperse the force, making it difficult that the melt-bonded portion between the annular projected portion 51 in the outer shell 50 and the fuel tank B has a force reducing the melt-bonding strength applied thereto.

The connector A, which has been fitted to the fuel tank B as explained, may be used for connection with a suitable pipe C.

In order to that the connector A can easily and reliably maintain the connection with the pipe C, the tubular unit 1 of the connector has the outer peripheral surface of the horizontal tubular portion 1b formed with the plural ridges, which comprise the conical guides 1c having a diameter gradually reduced toward the leading edge and the vertical stepped surfaces 1d extending from respective edges of the conical guides remote from the leading edge to the outer peripheral surface of the horizontal tubular portion 1b, in the shown embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel tank connector adapted to be fitted to an opening of a fuel tank to connect the fuel tank and a pipe in communicating fashion, comprising:
    a gas barrier member made of a synthetic resin having a gas barrier property, the gas barrier member including a tubular portion and a flanged portion provided on a peripheral side of the tubular portion, which extends beyond an opening of the fuel tank;
    wherein the gas barrier member is made of a blended polymer of an ethylene-vinyl alcohol copolymer and high-density polyethylene, a blended polymer of polyamide and polyethylene, or a blended polymer of polyamide and high-density polyethylene;
    the gas barrier member has at least a portion of a surface covered with an outer shell made of an olefin resin having an adhesive property, polyethylene or high-density polyethylene;
    the outer shell includes an annular projected portion, which covers a leading end of the flanged portion and projects toward an outer surface of the fuel tank, and
    wherein the gas barrier member has the leading end of the flanged portion provided with an annular projected portion, which projects toward the outer surface of the fuel tank and has a projecting length substantially equal to that of the annular projected portion of the outer shell, and the annular projected portion of the gas barrier member and the annular projected portion of the outer shell has a cavity formed therebetween to be opened on a side of the outer surface of the tank, the outer shell being made of polyethylene or high-density polyethylene.

2. The fuel tank connector according to claim 1, which is used for connection with a fuel feeding pipe.

3. The fuel tank connector according to claim 1, which is used for connection with a vent pipe.

4. The fuel tank connector according to claim 1, further comprising a fuel cutoff valve.

* * * * *